United States Patent [19]

Stauffer

[11] 4,103,152
[45] Jul. 25, 1978

[54] DISTANCE DETERMINING AND AUTOMATIC FOCUSING APPARATUS WITH FALSE PEAK DISCRIMINATION

[75] Inventor: Norman L. Stauffer, Englewood, Colo.

[73] Assignee: Honeywell Inc., Minneapolis, Minn.

[21] Appl. No.: 700,963

[22] Filed: Jun. 29, 1976

[51] Int. Cl.² ............................................. G01J 1/36
[52] U.S. Cl. ................................... 250/204; 250/201; 356/4
[58] Field of Search ................... 250/201, 204; 356/1, 356/4, 5; 354/25

[56] References Cited

U.S. PATENT DOCUMENTS

| | | | |
|---|---|---|---|
| 3,450,883 | 6/1969 | Thomas | 250/204 |
| 3,519,349 | 7/1970 | Berthold | 356/4 |
| 3,759,614 | 9/1973 | Harvey | 356/4 |
| 3,856,407 | 12/1974 | Takeda | 250/201 X |
| 3,898,676 | 8/1975 | Hosoe et al. | 354/25 |
| 3,904,869 | 9/1975 | Stauffer | 250/204 |
| 4,002,899 | 11/1977 | Stauffer | 250/201 |

Primary Examiner—Rudolph V. Rolinec
Assistant Examiner—Vincent J. Sunderdick
Attorney, Agent, or Firm—H. L. Hanson; C. J. Ungemach

[57] ABSTRACT

A camera lens forms an image of an object on an image plane. First and second mirrors produce respective first and second detection images of the object on respective first and second arrays of light sensors. These arrays form portions of an integrated circuit chip. One of the mirrors is moved throughout a scanning period to move its image on the corresponding array. A signal processing circuit receives the outputs of the light sensors and produces an output signal which experiences peaks for certain positions of the moved mirror. A circuit which receives the output signal produces a pulse for each peak which is larger than all previous peaks in the scanning period. One of the mirror positions causes the light distributions of the images to be in best correspondence on the arrays. This mirror position represents the existing object distance and produces a maximum one of the peaks, whereby this position produces the last pulse to be produced in the scanning period. The mirror position which produces this last pulse is represented by the position of a mechanical element or by the value of a mirror signal. A spring or an electric motor moves the lens into a final position which corresponds to the element position or to the mirror signal. This position of the lens thus corresponds to the existing object distance, and causes the image of the object to be in focus on the image plane. Each scanning period and automatic focusing operation may be produced on an individual basis on demand, or these periods may be produced in rapid succession to provide continuous automatic focusing operation.

5 Claims, 9 Drawing Figures

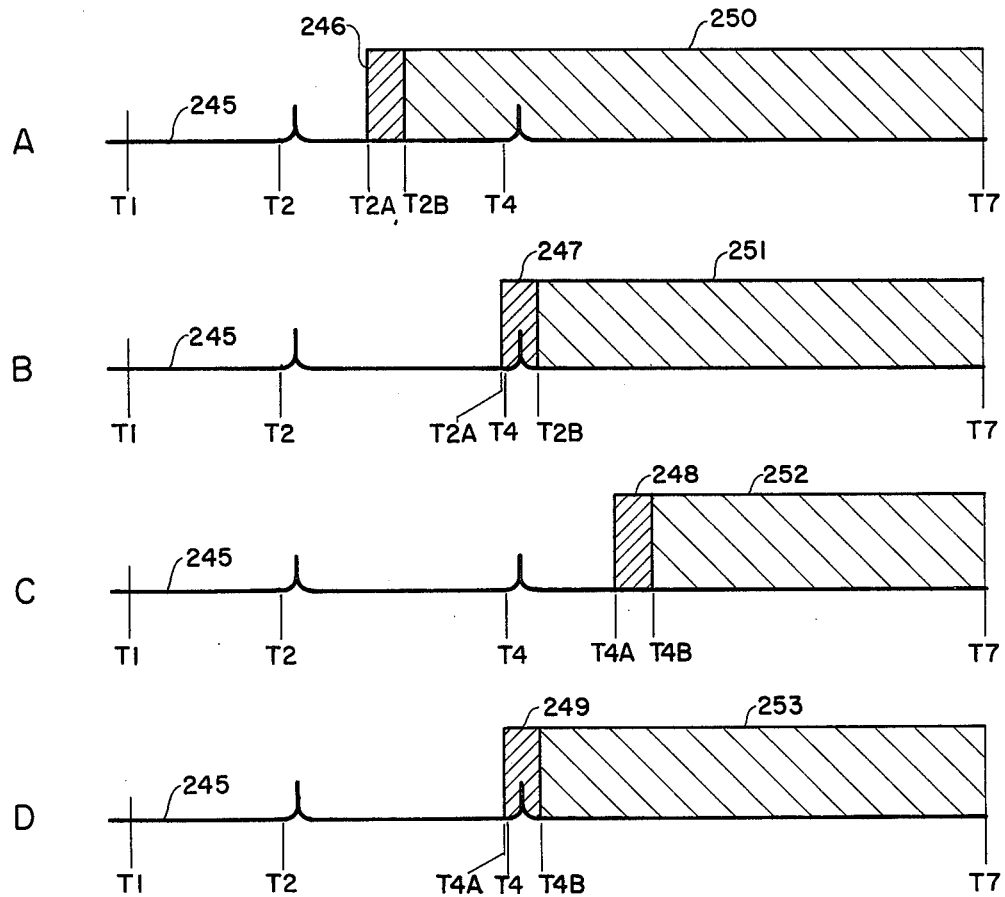
TIME IN SCANNING PERIOD
F I G. 9

DISTANCE DETERMINING AND AUTOMATIC FOCUSING APPARATUS WITH FALSE PEAK DISCRIMINATION

CROSS-REFERENCES TO RELATED APPLICATIONS

Subject matter disclosed but not claimed herein is disclosed and claimed in the following copending Stauffer U.S. patent applications:

(1) Ser. No. 627,607, filed Oct. 31, 1975, now U.S. Pat. No. 4,002,899 issued Jan. 11, 1977;

(2) Ser. No. 596,059, filed July 15, 1975, now U.S. Pat. No. 3,958,117 issued May 18, 1977; and (3) Ser. No. 700,829, filed on even date herewith.

BACKGROUND OF THE INVENTION

FIELD OF THE INVENTION

The present invention relates generally to apparatus for automatically providing a measure of the distance between the apparatus and an object. Specifically, the invention relates to the so-called spatial image correlation type or form of such apparatus, wherein the object distance is determined by relatively moving auxiliary image-producing auxiliary optical means and radiation responsive arrays to cause them to occupy a detectable correlation position, this position being a measure of the existing object distance. The invention relates as well to so-called automatic focusing apparatus which utilizes such a distance measure for automatically placing an optical element, such as a camera taking lens, in a focused condition relative to the object for the prevailing object distance.

DESCRIPTION OF THE PRIOR ART

Distance determining and automatic focusing arrangements of the spatial image correlation type noted above have been proposed in the past. In each of these known arrangements, the auxiliary optical means form a respective auxiliary, or detection, image of the object on each of two radiation responsive, or detector, arrays. The positions and radiation distributions of these auxiliary images on their corresponding arrays vary in a known manner with changes in the object distance, and with changes in the relative positions of the auxiliary optical means and the corresponding arrays.

Each of the said radiation responsive arrays is made up of a plurality of radiation responsive elements, and each of these elements in one of the arrays has a positional counterpart in the other of the arrays. Further, each of these elements provides an electrical signal which is representative of the intensity of the radiation impinging on that element. These signals are processed to produce an output signal which exhibits a peak in a predetermined direction whenever the radiation distributions of the two auxiliary images on their corresponding arrays are substantially identical or in a condition of so-called best correspondence. As used herein, the term "peak" covers both positive, or upward, and negative, or downward, peaks.

In each distance measuring or focusing operation in the known arrangements being described, at least one of the auxiliary images and its corresponding array are relatively moved to change the radiation distributions on the arrays. For convenience, this relative movement is generally achieved by moving or positioning a portion or member of the auxiliary optical means, such as an auxiliary lens or mirror, relative to the corresponding one of the arrays. To simplify the present description, such a member will be referred to hereinafter simply as the moved member.

At a certain position of the moved member which is determined by the then-existing object distance, the radiation distributions on the two arrays arrive at said condition of best correspondence, and the output signal experiences the above-noted peak. This position of the moved member is thus unique to, and identifies, the particular object distance then existent, and hence is a measure of that particular distance. For convenience, this particular position of the moved member is referred to as the correlation position for that particular distance, and the output signal peak which identifies this position is referred to as a correlation peak. Thus, there is a specific, unique correlation position of the moved member, identified by the occurrence of a correlation peak, for each object distance encountered by the apparatus within its operating range.

The known arrangements ascertain or detect said correlation positions of the moved member in order to provide a measure of the object distance. Specifically, said arangements provide such a measure by detecting each occurrence of an output signal peak and by ascertaining and providing a measure of the particular position which the moved member occupies at the time, in each distance determining operation, at which an output signal peak is produced and detected.

When the automatic focusing of a primary optical means, such as a camera taking lens, is effected by the apparatus just described, this apparatus includes control and drive means to move the primary optical means so as to make its position correspond to the currently detected correlation position of the moved member. The construction of this apparatus is such that, when the position of the primary optical means has been made to correspond to the current correlation position of the moved member, the primary image of the object produced by the primary optical means is in best focus on a predetermined image plane.

Examples of different forms of arrangements of the type described above are found in the above-listed three copending Stauffer applications, in the Stauffer U.S. Pat. No. 3,836,772 and No. 3,838,275, and in the U.S. Biedermann et al U.S. Pat. No. 3,274,914. In the Stauffer arrangements of the noted patents and application (1), the moved member is an auxiliary lens or mirror. This member, and a primary lens coupled thereto, are moved together, each time that the object distance changes, from a former correlation and focus position for the old object distance to a new correlation and focus position for the new object distance.

In the arrangements of the noted Stauffer application (2), the moved member is an auxiliary lens or mirror which is continuously reciprocated so that it is moved, swept, or scanned through its range of positions during each of continuously repeated time periods. The correlation position for the existing object distance is ascertained in each such sweep, and a primary lens is separately moved to the position corresponding to the last-determined correlation position. The construction of this apparatus is again such that the adjusted position of the primary lens which corresponds to the current correlation position of the scanning auxiliary lens or mirror causes the primary image to be in best focus.

In the apparatus of the noted Stauffer application (3), the moved member is an auxiliary mirror which is swept through its range of positions once each time that a focusing operation is initiated, and the correlation position of the mirror for the existing object distance is ascertained during the sweep. A primary lens is then separately moved to the position corresponding to the detected correlation position of the mirror. Again, this corresponding adjusted position of the lens provides best focus of the primary image.

In the Biederman et al form of apparatus, the moved member and a coupled primary lens are moved together, each time that a focusing operation is initiated, from a datum position (the infinity focus position of the lens) to the position in which correlation is achieved for the existing object distance. Subsequently, the moved elements are moved together back to the datum position, ready for the next focusing operation.

The known apparatus, exemplified by the arrangements described above, doubtless has practical utility for certain applications. All of these arrangements, nevertheless, are characterized by and share a significant shortcoming. Specifically, as is explained in the noted Stauffer application (1), it has been found that the said output signal experiences so-called minor peaks as the moved member is moving through positions other than the correlation position in a distance determining operation. As their name implies, such minor peaks are smaller than the related correlation peak which is produced when the moved member occupies the related correlation position. It has also been found that the apparatus responds to these minor peaks to the extent that the accuracy of the automatic focusing operation which is provided is seriously impaired. In such undesirable operation, the minor peaks cause the primary lens to be falsely moved to, and left at, positions which do not correspond to the desired or correlation position, and which hence do not cause the primary image to be in best focus.

It has been suggested in the last-mentioned application to apply a voltage clamping or limiting effect to the output signal in order to prevent the minor peaks from being effective to stop the primary lens at false positions. While such a signal clipping arrangement is satisfactory in some situations, it has been found to cause the apparatus to miss the maximum or correlation peaks in those situations wherein these peaks do not cause the signal value to exceed the clamping or clip level. Under such conditions, no correlation condition is detected, and the apparatus is incapable of properly positioning the primary lens.

SUMMARY OF THE INVENTION

Accordingly, it is an object of the present invention to provide improved spatial image correlation type distance measuring and automatic focusing apparatus which is not subject to the noted shortcomings of the previously known apparatus, and which thus causes the final position of the primary optical element for each focusing operation to be based solely upon the correlation peak of the output signal which occurs during that operation, no matter what specific value this peak has. Stated differently, the improved apparatus according to the present invention does not leave the primary optical element in any position dictated merely by minor peaks in the output signal, but instead finally places that element only in those positions which correspond to the correlation positions of the moved member. Accordingly, the false positioning of the primary optical element due to minor output signal peaks and/or undetected correlation peaks is eliminated.

In accordance with the present invention, the foregoing and other desirable objects are accomplished by the inclusion in said improved apparatus of scanning means to cause the moved member of the apparatus to be moved or scanned through its entire range of movement in each object distance determining and/or focusing operation or period. This improved apparatus also includes selective means which are responsive to the value of said output signal throughout the scanning period, and which produce a predetermined control effect, such as a signal polarity shift, only upon each occurrence of an output signal peak in the correlation direction which is greater than all peaks in that direction which have previously occurred in that period. Therefore, in each scanning period, the last position of the moved member at which said control effect is produced is the correlation position of the moved member for that period. Stated differently, the last control effect occurring in a given scanning period occurs when the maximum or correlation output signal peak occurs for that period, and hence when the moved member is in the correlation position for that period.

The improved apparatus of the invention also includes responsive means to ascertain or identify the position occupied by the moved member at the time at which each of said control effects is produced, and to provide a measure or representation of that position. The last of these measures to be provided in a given scanning period is thus a measure of the correlation position of the moved member, and hence is a measure of the existing object distance.

Where the automatic focusing of a primary optical element is to be effected, the improved apparatus further includes control means to place that element in a final position which corresponds to the last measure of the moved member position to be provided in the current scanning period. Thus, the primary optical element is placed in a position which corresponds to the moved member position at which the correlation peak occurred for that period, and which therefore corresponds to the current correlation position of the moved member and to the existing object distance. Minor output signal peaks do not and cannot influence this final position of said element. Accordingly, the latter is consistently placed in a position in which it causes the primary image of the object to be in proper focus on the desired image plane.

In the illustrated forms of the improved apparatus which has just been described, the moved member is a reciprocated mirror, and the primary optical element is a camera taking lens. Also, the output signal peaks are positive peaks. Further, the noted selective means in said illustrated forms is a circuit which provides a distinctive amplifier output polarity shift only upon a rise in said output signal to a peak which is higher or greater than any positive peak that said output signal has experienced previously in the current scanning period. The moved mirror positions at which such higher peaks are produced are identified or represented by the responsive means of said illustrated forms as positions of movable members or the values of mirror position signals.

BRIEF DESCRIPTION OF THE DRAWING

A better understanding of the present invention may be had from the following detailed description when read in connection with the accompanying drawings, wherein:

FIG. 9 is an operational curve diagram which supplements the FIG. 3 diagram with respect to the operation of the FIG. 8 apparatus.

DETAILED DESCRIPTION OF THE PREFERRED EMODIMENT

THE APPARATUS OF FIG. 1

Figure 1:
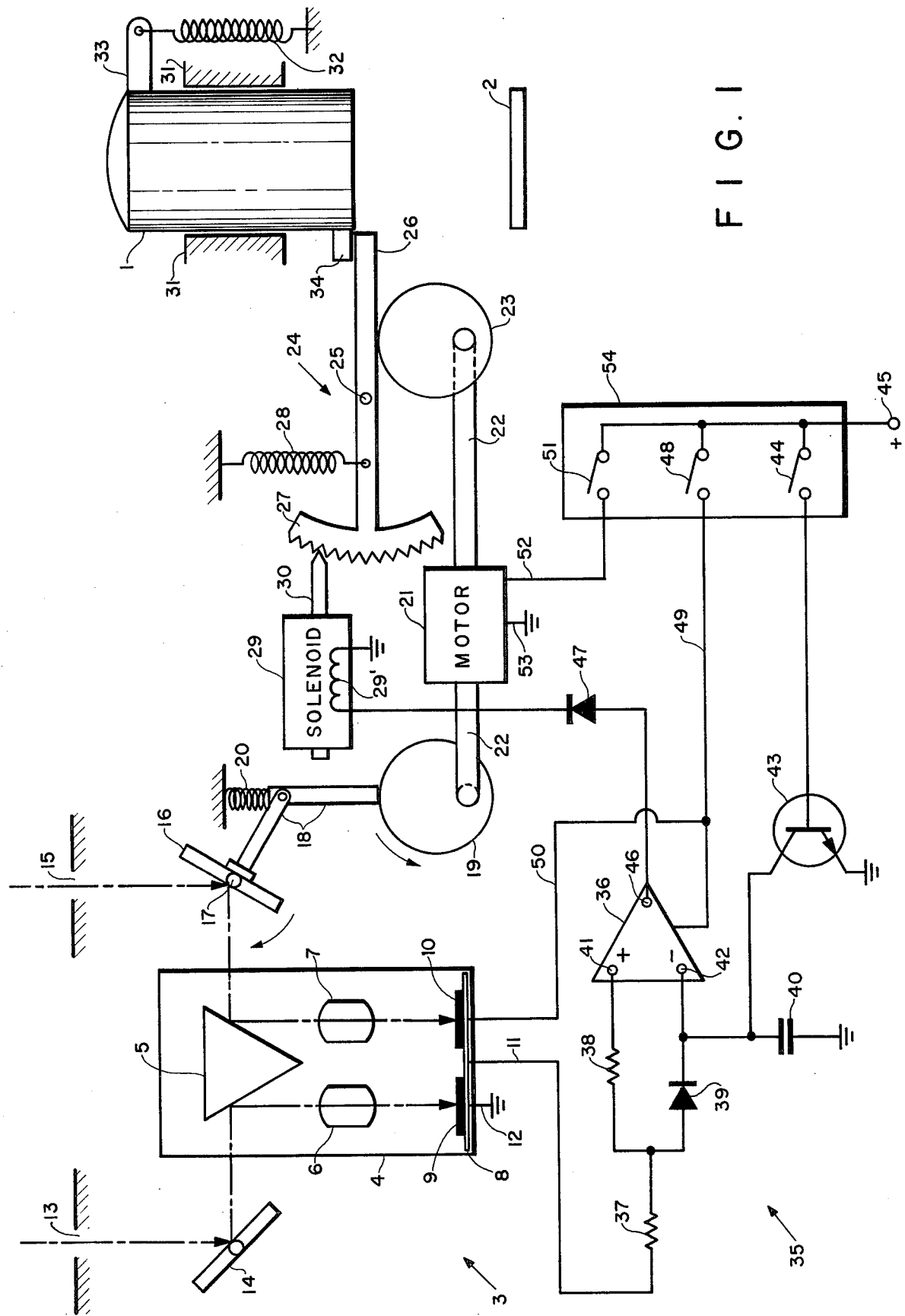
FIG. 1 is a diagrammatic representation of spatial image correlation automatic focusing apparatus embodying the present invention.

The apparatus shown in FIG. 1, and illustrating a preferred example of the above-noted improved apparatus embodying the present invention, is automatic focusing apparatus which, on demand, initiates a focusing operation in which the apparatus determines, and provides a measure of, the distance from the apparatus to a selected object. This distance is referred to hereinafter as the object distance. The apparatus then moves a primary lens 1 to a position which corresponds to the measure of the object distance which has been provided, in which position the lens 1 produces a focused image of the object on an image plane 2.

For illustrative purposes, it is assumed herein that the lens 1 is the taking lens of a photographic camera, and that the FIG. 1 apparatus is embodied in the camera to automate the camera focusing operation. The plane 2 then represents the film plane of the camera. The shutter and other known portions which such a camera would include have been omitted from the FIG. 1 showing in order to avoid unduly complicating the figure, the illustration of such portions not being necessary to an understanding of the present invention or its embodiments.

Figure 2:
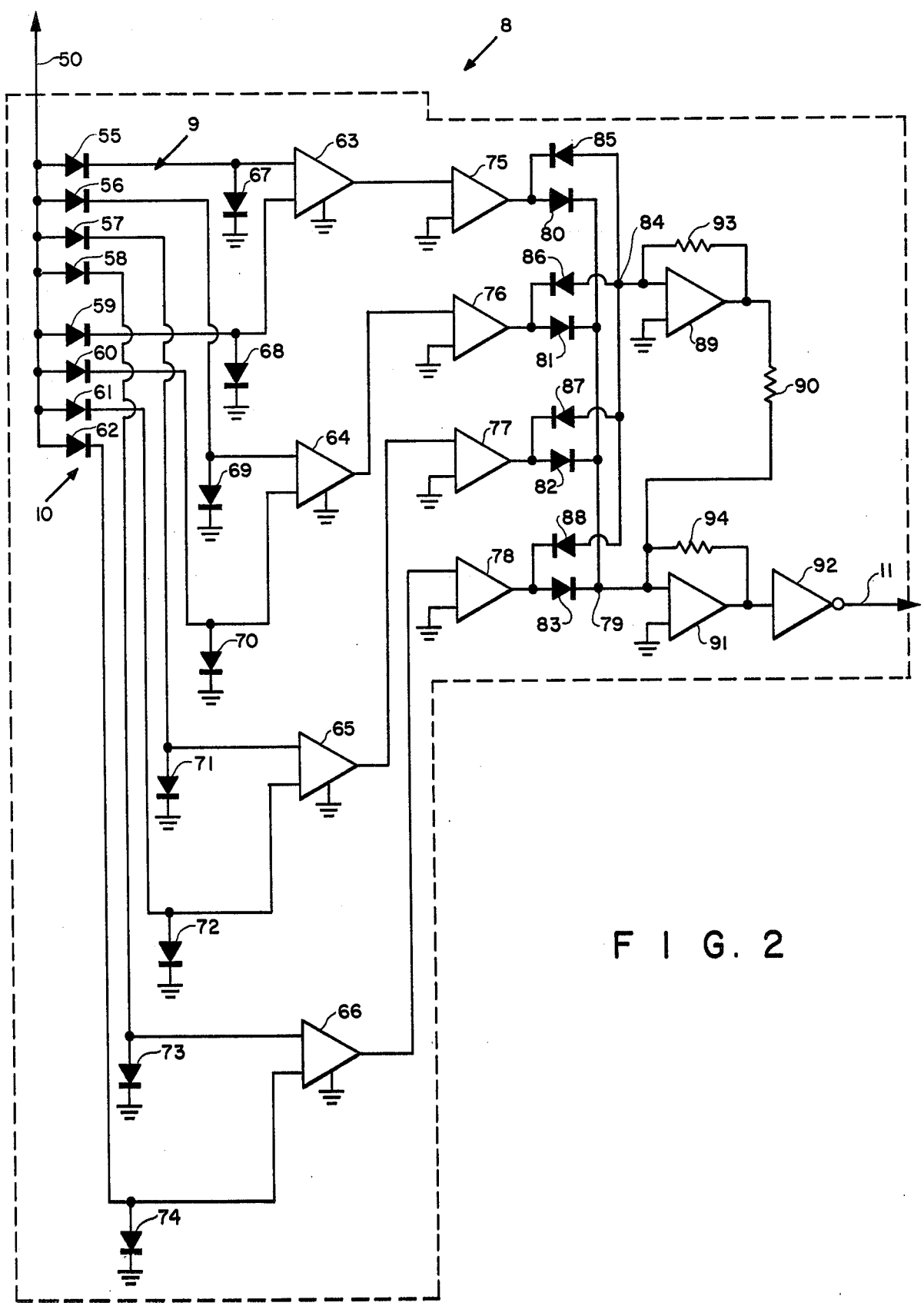
FIG. 2 is a schematic circuit diagram of one form which the circuit of the integrated circuit chip of the FIG. 1 apparatus may take.

The FIG. 1 apparatus includes an image correlation portion 3 of the type disclosed in the noted Stauffer applications. This portion includes a module 4 containing a reflecting prism or mirror 5, a lens 6, a lens 7, and an integrated circuit chip 8. The latter includes, as portions thereof, a plurality of radiation or light responsive elements which are arranged in first and second detector arrays 9 and 10, respectively. Such elements are shown in FIG. 2, to be described hereinafter. The chip 8 is also considered to include, as portions thereof, signal processing circuitry connected to the elements of the arrays 9 and 10 and operative to process the output signals of said elements to form a processed or chip output signal. The latter is produced between a chip output connection 11 and a chip output connection 12. The latter is connected to ground or circuit common.

The portion 3 also includes an aperture 13 and an auxiliary mirror 14 which cooperate with the prism 5 and the lens 6 to form a first auxiliary or detection image of the object on the detector array 9. Similarly, the portion 3 also includes an aperture 15 and a movable or scanning auxiliary mirror 16 which cooperate with the prism 5 and the lens 7 to form a second auxiliary or detection image of the object on the detector array 10.

The dash-dot lines of FIG. 1 are provided merely to show the general paths over which the radiation or light from the object would pass in forming the detection images on the respective arrays 9 and 10. Accordingly, these lines are not intended to show the specific light paths or image positions which would result from the specific element positions shown by way of example in FIG. 1. This applies also to the arrangements illustrated in FIGS. 4, 6, 7, and 8.

As in the case of the apparatus disclosed in the above-noted Stauffer applications, the angle of view of each of the optical arrangements forming the detection images is made to be the same as that of the other, and is desirably made to be relatively small, of the order of one to ten degrees. Also, these arrangements are so constructed and oriented with respect to the arrays 9 and 10 and the lens 1 that the image formed on the array 9 is substantially identical to the image formed on the array 10. In other words, each of these two detection images represents the same portion of the entire primary image which is formed on the plane 2 by the lens 1.

It is noted that is is not necessary that the two detection images be in focus on the corresponding arrays. All that is required is that each of these images has a distinguishable spatial radiation, or light, distribution on its corresponding array.

The mirror 16 is pivoted at 17, and is provided with a compound lever 18 having a lower, cam follower end. The latter is maintained in contact with the periphery of an eccentric cam 19 by a compression spring 20. A motor 21, when energized, rotates the cam 19 in the counter-clockwise direction as shown by the arrow. This rotation is effected by way of a shaft 22. These elements are included in the aforementioned scanning means of the apparatus.

The elements 16, 18, and 19 are shown in FIG. 1 in their so-called near limit positions. This position of the mirror 16 is its correlation position for the nearest or closest object, or shortest or minimum object distance, which the apparatus is arranged to handle.

When the motor 21 is energized, the first 180° of rotation of the cam 19 from the illustrated position cause the mirror 16 to rotate in the clockwise direction, shown by the arrow, about the pivot 17 to its so-called far limit or infinity position. This motion of the mirror 16 establishes a scanning or focus-determining period of the apparatus. For the remaining 180° of rotation of the cam 19, the mirror 16 is rotated in the counterclockwise direction back to the near limit position shown in FIG. 1. The far limit position of the mirror 16 is its correlation position for object distances which are greater than a predetermined valued, such as thirty feet.

The aforementioned responsive means of the apparatus include a cam 23 which is attached to the shaft 22 for synchronous rotation with the cam 19. The responsive means also include a lever 24 which is pivoted at 25 and has a cam follower portion 26 and a toothed sector portion 27. The lever 24 is biased by a tension spring 28 for clockwise rotation about the pivot 25.

A solenoid 29 has a winding 29', and has a plunger 30 which coacts with the teeth of the sector 27 in such a manner that, when the solenoid is deenergized, the plunger 30 engages the teeth of the sector 27 and holds the lever 24 stationary against the urging of the spring 28. Whenever the solenoid 29 is energized, the plunger 30 is retracted, and the spring 28 acts to rotate the lever 24 in the clockwise direction to maintain the portion 26 in contact with the periphery of the cam 23.

The lens 1 is slideably supported within guide means 31 for movement in an up-and-down direction as viewed in FIG. 1. The lens 1 is shown at its so-called near limit position, which is the position at which it produces a focused image on the plane 2 for the above-noted minimum object distance that the apparatus is arranged to handle. In this position, the lens 1 is "out" at its maximum distance from the plane 2.

A tension spring 32, attached to a member 33 on the lens 1 and forming part of the aforementioned control means, urges the lens 1 in a downward direction within the guide means 31 to cause a projection 34 on the lens 1 to engage the portion 26 of the lever 24. Thus, the position of the lens 1 is determined by the extent of the rotation of the lever 24. Rotation of the latter into its extreme clockwise position allows the lens 1 to move downward or "in" to its far limit or infinity position. This is the position in which the lens 1 produces a focused image on the plane 2 for object distances from the above-assumed thirty feet to infinity.

The FIG. 1 apparatus also includes selective means 35 which include an operational amplifier 36, resistors 37 and 38, a diode 39, and a capacitor 40. The chip output connection 11 is connected through the resistors 37 and 38 to the noninverting input terminal 41 of the amplifier 36. Accordingly, the chip output signal is applied to the terminal 41. The anode of the diode 39 is connected to the junction between the resistors 37 and 38, and the cathode of the diode 39 is connected to the inverting input terminal 42 of the amplifier 36. The capacitor 40 is connected between the last mentioned terminal and ground. Accordingly, the capacitor 40 is charged by the chip output signal, and the signal on the capacitor 40 is applied to the terminal 42.

A transistor 43 is provided as a means for selectively discharging or resetting the capacitor 40. The collector of the transistor 43 is connected to the upper terminal of the capacitor 40, and the transistor emitter is connected to ground. The transistor base is connected through a switch 44 to the positive supply terminal 45 of a suitable power source, not shown. The negative terminal of this source is considered to be connected to ground.

As will be described more fully hereinafter, the construction of the selective means 35 as just described causes the amplifier 36 to produce a characterized output signal on an output terminal 46. Briefly, the signal produced on the terminal 46 switches from a positive to a negative value each time that the chip output signal experiences a positive peak which is higher or greater than all previous positive peaks which this signal has experienced since the capacitor 40 was last reset.

The output terminal 46 of the amplifier 36 is connected to the anode of a diode 47, the cathode of which is connected to one end of the winding 29' of the solenoid 29. The remaining end of that winding is connected to ground. Accordingly, the output signal on the terminal 46 is applied across the winding 29', to energize the solenoid 29 and retract the plunger 30, whenever the signal on the terminal 46 is positive.

The operation of the chip 8 and the amplifier 36 is started and stopped by the respective closing and opening of a switch 48. To illustrate this, the switch 48 is shown as being connected between the terminal 45 and a supply conductor 49 for the amplifier 36. Also, a supply conductor 50 is shown as being connected between the conductor 49 and the chip 8.

The operation of the motor 21 is controlled by a switch 51. To this end, an energizing conductor 52 for the motor 21 is connected through the switch 51 to the terminal 45. The remaining energizing conductor 53 for the motor 21 is connected to ground.

The switches 44, 48, and 51 are included in a control portion 54 of the apparatus, and are actuated at appropriate times during each focusing operation. This will be explained more fully in the description of the operation of the FIG. 1 apparatus which follows the description of FIG. 2 now to be provided.

THE APPARATUS OF FIG. 2

As previously noted, FIG. 2 illustrates one form which the circuit of the chip 8 of the FIG. 1 apparatus may take. This illustrated form of circuit is similar to that illustrated in the above-noted Stauffer application (2), and includes the above-noted light responsive elements and signal processing circuitry.

In FIG. 2, the above-noted light responsive elements are shown as photodiodes 55 through 62. The photodiodes 55 through 58 are included in the first detector array 9, and the photodiodes 59 through 62 are included in the second detector array 10. The showing of four photodiodes as forming each of the detector arrays 9 and 10 has been made for illustrative purposes, and it is to be understood that each array could include any desired number of any desired form of light responsive elements.

The anodes of the photodiodes 55 through 62 are connected to the chip supply conductor 50. The cathode of each of the photodiodes 55 through 58 is connected to one of the inputs of a corresponding one of four differential amplifiers 63 through 66. The cathode of each of the photodiodes 59 through 62 is connected to the remaining input of a corresponding one of the amplifiers 63 through 66. Specifically, the photodiodes 55 and 59 are connected to respective inputs of the amplifier 63, the photodiodes 56 and 60 are connected to respective inputs of the amplifier 64, the photodiodes 57 and 61 are connected to respective inputs of the amplifier 65, and the photodiodes 58 and 62 are connected to respective inputs of the amplifier 66. The common terminals of the amplifiers 63 through 66 are connected to ground.

As a result of the connections just described, the photodiodes of the array 9 are connected in pairs with the positionally-corresponding photodiodes of the array 10, with each diode pair being connected to the inputs of a corresponding one of the amplifiers 63 through 66.

A respective one of diodes 67 through 74 is connected between each of the amplifier inputs and ground to cause the photodiode output signals as applied to the amplifier inputs to represent the logs of the light intensities on the corresponding photodiodes. This is done to make the output signals of the amplifiers 63 through 66 essentially independent, within wide limits, of the absolute level of the light of the detection images falling on the arrays 9 and 10.

The output of each of the amplifiers 63 through 66 is connected across the input of a corresponding one of amplifiers 75 through 78. The output of each of the amplifiers 75 through 78 is connected to a common point 79 through the anode-cathode path of a respective one of diodes 80 through 83. Also, the output of each of the amplifiers 75 through 78 is connected to a common point 84 through the cathode-anode path of a respective one of diodes 85 through 88.

The point 84 is connected to one input of an amplifier 89, the other input of which is connected to ground. The output of the amplifier 89 is connected through a resistor 90 to one input of an amplifier 91, to which input the point 79 is also connected. The other input of the amplifier 91 is connected to ground. The output of the amplifier 91 is connected through an inverter 92 to the output connection 11. A feedback resistor 93 is connected between the output and the ungrounded input of the amplifier 89, and a feedback resistor 94 is connected between the output and the ungrounded input of the amplifier 91.

In a manner which is explained in detail in the above-noted Stauffer application (1), the construction of the chip 8 as just described causes the output signal of each of the amplifiers 63 through 66 to be a resultant signal which represents the ratio of the intensities of the light falling on the photodiodes of the pair of photodiodes which is connected to that amplifier. These resultant signals are made positive, as necessary, and the four positive signals are summed to form the output signal between the input to the inverter 92 and ground. Each of these resultant signals attains a minimum value when the two photodiodes which produce it are most similarly illuminated. Consequently, the output signal on the connection 11 attains a maximum positive peak value when there is best correspondence between the light distributions of the two detection images on the arrays 9 and 10.

OPERATION OF THE APPARATUS OF FIG. 1

In connection with the following description of the oepration of the FIG. 1 apparatus, it is desirable that the following criteria be kept in mind:

1. For any given position of the mirror 16, the two images formed on the respective arrays 9 and 10 move apart as the object distance decreases, and move together as the object distance increases. Accordingly, the greater or longer the object distance, the further the image on the array 9 will be toward the right.

2. As the mirror 16 is rotated or scanned progressively clockwise from its illustrated near limit position to its fully clockwise or far limit position, the image formed on the array 10 moves correspondingly toward the right.

3. As the mirror 16 is rotated progressively clockwise during its scanning travel, it reaches, and passes through, a position at which the light distribution of the image on the array 10 best corresponds to the light distribution of the image on the array 9. This is the correlation position of the mirror 16 for the existing object distance, and this particular position thus represents this particular object distance. The attainment of this best light distribution correspondence and correlation position is manifested by the attainment of a maximum positive or correlation peak value by the chip output signal on the connection 11.

4. The greater the object distance from its minimum value, the further the mirror 16 will have been rotated in its scanning period at the time at which it temporarily occupies the correlation position for the existing object distance and causes the chip output signal to experience the maximum or correlation peak for that period.

The manner in which the FIG. 1 apparatus operates will be described by reference to its operation for a typical situation, which is illustrated by the curves 95 through 99 of the operational curve diagram of FIG. 3. Specifically, the description which follows is that of the automatic focusing operation which typically takes place as the aforementioned camera which includes the FIG. 1 apparatus operates to make a typical photograph of an object. For illutrative purposes, it is assumed that the distance to said object is of the order of twenty feet, that the automatic focusing action is the first phase of the camera operation, and that this operation and action are started by an operator's actuation of an appropriate control on the camera at a time T1. This time, as well as others occurring during the described automatic focusing operation, are designated on the curves of FIG. 3.

Figure 3:
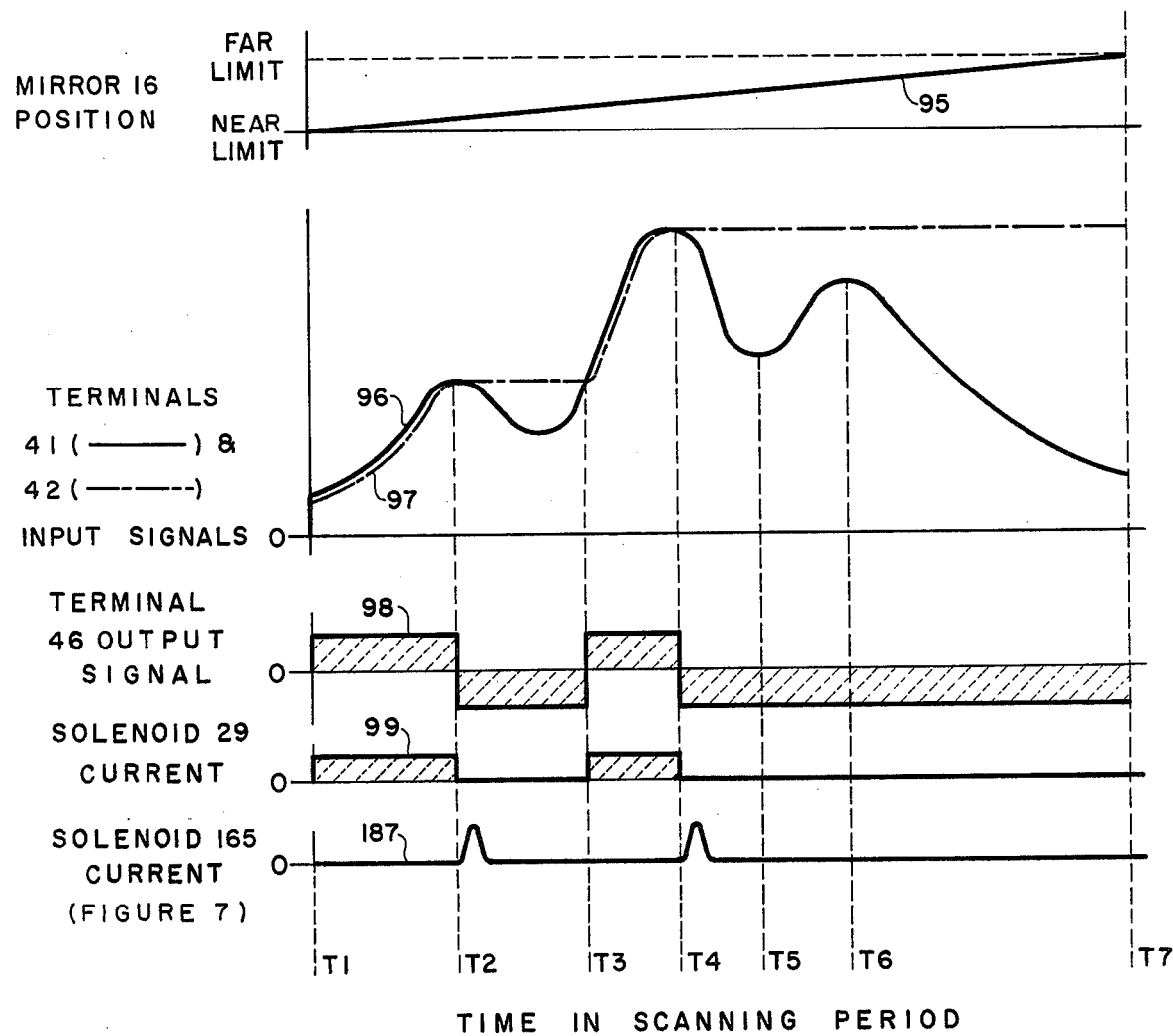
FIG. 3 is an operational curve diagram illustrating the operation of the FIG. 1, FIG. 7, and FIG. 8 apparatus for a typical situation.

The curves of FIG. 3 show the variations in the position of the mirror 16, and in certain of the signals produced in the FIG. 1 apparatus, which take place during the scanning period of the typical operation being considered. Specifically, the curves 95 through 99 show the variation of the following items with respect to time:

| CURVE | ITEM |
|---|---|
| 95 | position of mirror 16 |
| 96 | chip output signal on terminal 41 |
| 97 | stored signal on terminal 42 |
| 98 | output signal on terminal 46 |
| 99 | current in solenoid 29 |

Just prior to the time T1 at which the automatic focusing operation is started, the switch 51 is open, the motor 21 is not operating, and the mirror 16 is stationary in its illustrated near limit position as shown by the curve 95. The switch 48 also is open, whereby the chip output signal on the connection 11 and on the amplifier input terminal 41 is zero as shown by the curve 96. The amplifier output signal on the terminal 46 is also zero as shown by the curve 98. There is no current flowing through the solenoid 29, as shown by the curve 99, whereby the solenoid 29 is deenergized and the plunger 30 engages the teeth of the sector 27. The lever 24 occupies the position shown in FIG. 1, in which position the lever portion 26 holds the lens 1 up or out at its near limit position. The switch 44 is closed, whereby the transistor 43 is on and prevents any signal from appearing across the capacitor 40 as shown by the curve 97.

At the time T1 at which the operator actuates the camera control to start the automatic focusing operation, such actuation closes the switches 48 and 51, and opens the switch 44. The closure of the switch 51 energizes the motor 21 to start the counterclockwise rotation of the cams 19 and 23 and the clockwise or scanning rotation of the mirror 16. Accordingly, the scanning period for the operation being considered starts at the time T1. This is shown by the FIG. 3 curve 95, which also shows the consequent position and scanning movement of the mirror 16 throughout the scanning period.

The closure of the switch 48 at the time T1 powers the chip 8 and the amplifier 36. As a result, the chip output signal on the connection 11 and on the amplifier input terminal 41 rises to some initial value at the time T1 as shown by the curve 96.

The opening of the switch 44 at the time T1 turns off the transistor 43 and allows a signal to appear across the capacitor 40 and on the amplifier input terminal 42. Due to the action of the capacitor 40, the signal on the terminal 42 at the time T1 is less than the signal on the terminal 41, as is shown by the curve 97.

Since the terminal 41 is positive with respect to the terminal 42 at the time T1, a positive output signal appears on the terminal 46 at this time as shown by the curve 98. Consequently, current starts to flow through the solenoid 29 at this time as shown by the curve 99. This current retracts the plunger 30, whereby the lever 24 is released.

The spring 28 now causes the lever 24 to rotate clockwise to the extent permitted by the position of the now rotating cam 23. Thus, the lever portion 26 starts to move downward at the time T1, following the position of the cam 23. The lens 1 is now permitted to move downward correspondingly, under the action of the spring 32.

As the mirror 16 continues its scanning rotation following the time T1, as shown by the curve 95, the chip output signal on the terminal 41 rises as shown by the curve 96. The signal on the terminal 42 also rises as shown by the curve 97. However, due to the action of the capacitor 40, the signal on the terminal 42 lags the signal on the terminal 41 as shown by the curves 96 and 97. Accordingly, the output signal on the terminal 46 remains at the positive value shown by the curve 98, and the solenoid 29 remains energized as shown by the curve 99.

The continued energization of the solenoid 29 permits the level portion 26 and the lens 1 to continue their above-noted downward movements under the control of the cam 23. Accordingly, the positions of the lever portion 26 and the lens 1 are kept in correspondence with the position of the mirror 16.

The solenoid 29 remains energized, and the noted movements of the lever 24 and the lens 1 continue, until the rotation of the mirror 16 brings the latter into a position at which the chip output signal experiences a positive peak. This is shown by the curve 96 as occurring at a time T2. This time T2 is actually the time at which the chip output signal on the terminal 41 has just slightly passed its peak value and has started downward, whereby the signal held on the terminal 42 by the capacitor 40 has just become greater than the signal on the terminal 41. As soon as the signal on the terminal 42 so predominates, the output signal on the terminal 46 rapidly switches to a negative value as shown by the curve 98. Consequently, the following events occur at the time T2:

1. The solenoid current drops to zero as shown by the curve 99;
2. The solenoid plunger 30 is released and engages the teeth of the sector 27; and
3. The rotation of the lever 24 and the downward movement of the lens 1 are arrested at a position corresponding to the position occupied by the mirror 16 at the time T2 at which the peak occurred in the chip output signal.

As a result of the foregoing actions, the lens 1 is now held in a position which corresponds to the position of the mirror 16 at which the chip output signal peaked. At this point in the operation, the apparatus must assume that the said peak was the correlation peak, and that the object distance is that for which the lens 1, in its present stopped position, produces a properly focused image of the object on the plane 2.

As is shown by the curve 96, however, this is not the case. Instead, the peak occurring at the time T2 is one of the above-noted minor or false peaks, and the object distance corresponding to the arrested position of the lens 1 is significantly less than the existing object distance. Thus, the lens 1 is not as yet properly focused with respect to the object.

Notwithstanding the detection of the chip output signal peak at the time T2, and the stopping of the lever 24 and the lens 1 in corresponding though inappropriate positions, the scanning rotation of the mirror 16 continues. As shown by the curve 96, this continued movement of the mirror 16 causes the chip output signal to decrease to a minimum value and then to start to increase toward the signal of the curve 97 which the capacitor 40 has been holding on the terminal 42. As can be seen from the curves 96 and 97, the signal held by the capacitor 40 represents the peak value which the chip output signal experienced at the time T2. This is made possible by the action of the diode 39.

The increasing chip output signal subsequently exceeds the signal held on the terminal 42. This is shown in FIG. 3 as occurring at a time T3. Up until this time, the signal on the terminal 42 has predominated over the signal on the terminal 41, the output signal on the terminal 46 has been negative, there has been no current flowing through the solenoid 29, and the plunger 30 has held the lever 24 stationary. By the time T3, the cam has continued its rotation to an extent that there is a corresponding gap between the periphery of the cam 23 and the arrested lever portion 26.

At the time T3, at which the signal on the terminal 41 once against just exceeds the signal on the terminal 42, the output signal on the terminal 46 rises to its positive value as shown by the curve 98, and the solenoid current is restored as shown by the curve 99. At this time, therefore, the plunger 30 retracts and releases the lever 24, allowing the spring 28 to move the lever portion 26 rapidly down into a position of engagement with the advanced position of the cam 23. As the scanning cycle continues, therefore, the portion 26 is held in contact with the cam 23 and moves downward as the cam 23 continues its rotation.

The rapid downward movement of the lever portion 26 into enegagement with the cam 23 allows the spring 32 to pull the lens 1 down until its projection 34 is stopped by the lever portion 26. This lens movement will usually lag the rapid catching-up movement of the portion 26, due to the greater mass of the lens 1. Such lens movement is appropriate, since it is now evident that the chip output signal is going to rise to a peak that exceeds the peak which occurred at the time T2, and that the initial arrested position of the lens was not the correct one.

The continued scanning rotation of the mirror 16 subsequently brings the latter into a position at which the chip output signal reaches a second peak. This occurs at a time T4. At this time, the signal on the terminal 42 once agains exceeds the signal on the terminal 41, the output signal on the terminal 46 shifts to its negative value, the solenoid current is interrupted, and the plunger 30 arrests the movement of the lever 24 in a position corresponding to the position occupied by the mirror 16 at the time at which the time T4 peak occurs. The downward movement of the lens 1 is now arrested at a focus position for an object distance corresponding to the peak-producing position of the mirror 16 at the time T4.

As shown by the curve 96, the continued scanning motion of the mirror 16 causes the chip output signal to dip to a low value at a time T5, to rise to still another minor peak at a time T6, and then to decrease to a final low value at a time T7 which represents the end of the scanning period. Since the chip output signal does not again reach the former peak level, as stored on the capacitor 40, the output signal on the terminal 46 remains negative thoughout the remainder of the scanning period. Accordingly, the solenoid 29 holds the lever 24 and the lens 1 in the positions corresponding to the mirror position at which the time T4 peak occurred. It is now apparent that this peak was the correlation peak, that the corresponding mirror position at the time T4 was the correlation position, and that the corresponding arrested position of the lens 1 is the proper focus position for the existing object distance.

At the completion of the scanning period at the time T7, the camera mechanism may well be automatically actuated to photograph the in-focus image provided by the properly positioned lens 1. Subsequently, the continuing rotation of the cams 19 and 23 restores the mirror 16 and the lens 1 to their illustrated near limit positions, and the switches in the portion 54 are actuated to place them in the noted conditions which they occupied just prior to the time T1. In this way, the apparatus is reset and made ready for the next automatic focusing and object photographing operation.

The foregoing description of the typical operation of the FIG. 1 apparatus illustrates the manner in which this apparatus causes the position of the lever 24 and the lens 1 to correspond to each position of the mirror 16 at which each greater chip output signal peak occurs. It has also been shown how that the last of these greater peaks and mirror positions are the correlation ones for the existing object distance, how that the last position of the lever 24 represents this object distance, and how that the last position of the lens 1 is thus the proper focused position for that object distance.

THE APPARATUS OF FIG. 4

Figure 4:
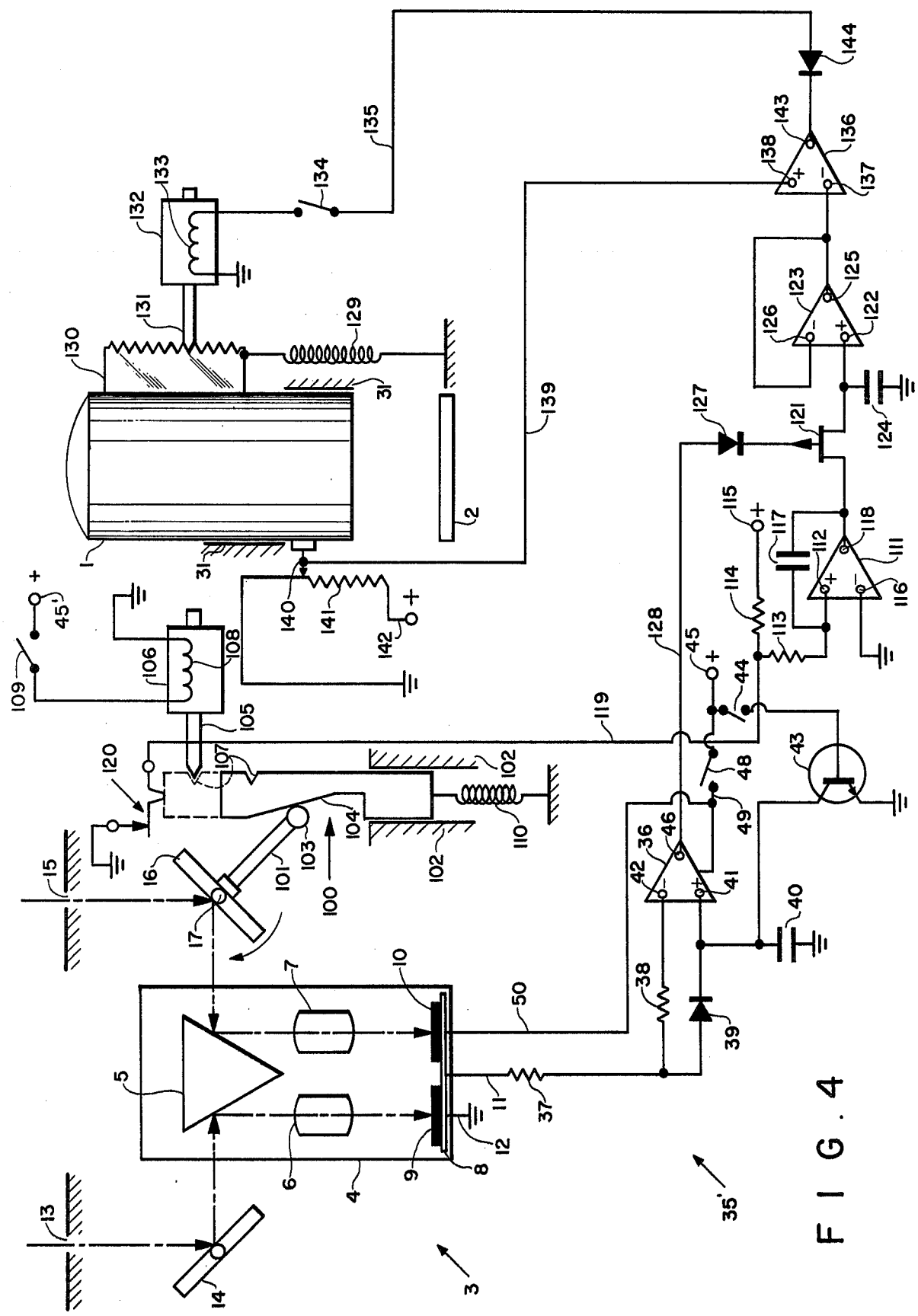
FIG. 4 is a diagrammatic representation of a modified form of the FIG. 1 apparatus.

FIG. 4 shows a modified form of the FIG. 1 apparatus whih includes different scanning, responsive, and control means - that is, different means for moving the mirror 16, for ascertaining the mirror positions at which greater chip output signal peaks occur, and for positioning the lens 1. Elements which are common to both the FIG. 4 and the FIG. 1 arrangements are identified by the same reference numerals in both figures. This applies also to the arrangements of FIGS. 6, 7, and 8 to be described hereinafter.

Considering first the portions of the FIG. 4 apparatus which are present also in the FIG. 1 apparatus, it is noted that the FIG. 4 apparatus includes the lens 1 with its guide means 31, the image plane 2, the image correlation portion 3, and the elements 4 through 17 included therein. The FIG. 4 apparatus also includes the switches 44 and 48, the terminal 45, the conductors 49 and 50, and a selective means 35'. The latter is identical to the selective means 35 of the FIG. 1 apparatus except that the connections to the input terminals of the amplifier 36 are interchanged. This is done so that each greater positive chip output signal peak causes the amplifier output signal to switch from a negative to a positive value. To this end, the resistors 37 and 38 are connected to the inverting input terminal 42 of the amplifier 36, and the diode 39 and the capacitor 40 are connected to the non-inverting amplifier input terminal 41. As before, the reset transistor 43 is connected across the capacitor 40 and is controlled by the switch 44.

In the FIG. 4 apparatus, the mirror 16 is reciprocally rotated or given its scanning movement through the medium of a cam member 100 and a mirror arm 101. Specifically, the member 100 is arranged to have vertical movement within guide means 102 between an upper limit position and a lower limit position. The position in which the member 100 is shown in FIG. 4 is an intermediate position lying between said upper and lower limit positions.

The arm 101 has an upper end which is attached to the back of the mirror 16 at a point adjacent the pivot 17. The arm 101 also has a lower or cam follower end 103 which is maintained in engagement with a cam or ramp surface 104 of the member 100.

Restoring means, not shown, are arranged to move the member 100 up to its upper limit position prior to the start of each automatic focusing operation and scanning period. When the member 100 occupies this upper limit position, its upper end has the position shown in dashed lines. This position of the member 100 causes the mirror 16 to occupy its near limit or extreme counterclockwise position through the coaction of the ramp surface 104 and the follower end 103 of the mirror arm 101.

Also prior to the start of each scanning period, the member 100 and the mirror 16 are held in the last-noted positions by the plunger 105 of a deenergized solenoid 106. Specifically, the plunger 105 then engages a notch 107 in the member 100. The solenoid 106 has a winding 108, one end of which is connected through a switch 109 to a supply terminal 45'. The latter may be connected to the source to which the terminal 45 is connected. The remaining end of the winding 108 is connected to ground.

When a scanning period is to be started, the switch 109 is closed to effect the energization of the solenoid 106 and the consequent retraction of the plunger 105. This allows a spring 110 to pull the member 100 down to its lower limit position. As the member 100 so moves downward, the cooperating follower end 103 and ramp surface 104 rotate the mirror 16 in the clockwise or scanning direction shown by the arrow. When member 100 reaches its lower limit position, the mirror 16 occupies its far limit or extreme clockwise position. The position in which the mirror 16 is shown in FIG. 4 is an intermediate position lying between said near limit and far limit positions.

Accordingly, as the released member 100 moves from its upper limit position to its lower limit position under the influence of the spring 110, a scanning period takes place in which the mirror 16 is rotated in the clockwise direction from its near limit position to its far limit position. Subsequently, the above-mentioned restoring means raises the member 100 to return it and the mirror 16 to their respective upper limit and near limit positions.

The responsive means of the FIG. 4 apparatus, which provide a measure of each mirror position at which a greater chip output signal peak occurs, include a ramp signal generating and gating arrangement which produces a mirror position signal. This signal represents the positions of the mirror 16 at which the greater chip output signal peaks occur. This arrangement includes an operational amplifier 111 which is utilized as an integrator. Specifically, the non-inverting input terminal 112 of the amplifier 111 is connected through resistors 113 and 114 to a positive power supply terminal 115. The latter may be connected to the source to which the terminal 45 is connected. The inverting input terminal 116 of the amplifier 111 is connected to ground. An integrating capacitor 117 is connected between the output terminal 118 of the amplifier 111 and the non-inverting input terminal 112.

The junction between the resistors 113 and 114 is connected by a conductor 119 and a switch 120 to ground. The switch 120 is so arranged with respect to the member 100 that (a) the switch 120 is closed whenever the member 100 occupies its upper limit position, and (b) the switch 120 opens each time that the member 100 begins its downward or scanning travel. When the switch 120 is open, the signal at the output terminal 118 rises with time and hence with the movement of the mirror 16. When the switch 120 is closed, the signal on the output terminal 118 drops to zero. The signal on the terminal 118 is thus a ramp signal which follows and is proportional to the position of the mirror 16.

The output terminal 118 is connected through an FET switch 121 to the non-inverting input terminal 122 of an operational amplifier 123. A memory capacitor 124 is connected between the terminal 122 and ground.

The amplifier 123 is connected as a voltage follower or isolating amplifier to prevent the unwanted discharge of the capacitor 124. To this end, the output terminal 125 of the amplifier 123 is connected to the inverting input terminal 126 of the latter.

The gate of the FET 121 is connected through a diode 127 and a conductor 128 to the output terminal 46 of the amplifier 36. This construction is such that, when the output signal on the terminal 46 is positive, as it is following each greater peak of the chip output signal, the FET 121 is off and the capacitor 124 holds the signal on the input terminal 122 at the value which it has at the time the signal on the amplifier output terminal 46 goes positive. When the last mentioned signal is negative, the FET 121 is on, and the signal on the amplifier input terminal 122 and on the capacitor 124 follows the position of the mirror 16. Consequently, the signal on the input terminal 122 and on the output terminal 125 is the above-noted mirror position signal.

The lens 1 is shown in FIG. 4 as being fully out at its near limit position. The control means for this lens include a tension spring 129 which is attached to a rack member 130 on the lens, and which urges the latter in a downward direction. The lens 1 is normally prevented from moving downward under the influence of the spring 129 by the plunger 131 of a solenoid 132 which engages the teeth of the rack member 130 when the solenoid 132 is deenergized. The solenoid 132 has a winding 133, one end of which is connected to ground. The other end of the winding 133 is connected through a switch 134 to a conductor 135.

An operational amplifier 136 is arranged as a comparator to control the positioning of the lens 1 as necessary to make the lens position correspond to the maximum peak producing position of the mirror 16. To this end, the inverting input terminal 137 of the amplifier 136 is connected to the output terminal 125 of the amplifier 123 to receive the mirror position signal. The non-inverting input terminal 138 of the amplifier 136 is connected by a conductor 139 to a sliding contact 140 which engages a resistor 141. The contact 140 is mounted on the lens 1 so that the position of the contact 140 along the resistor 141 is a measure of the lens position. One end of the resistor 141 is connected to a positive supply terminal 142, and the other end of the resistor 141 is connected to ground. The terminal 142 may be connected to the source to which the terminal 45 is connected. The output terminal 143 of the amplifier 136 is connected to the cathode of a diode 144, the anode of which is connected to the conductor 135.

As a result of the above-described connections, a lens position signal is applied to the input terminal 138 for comparison to the mirror position signal which is applied to the input terminal 137. As long as the mirror position signal on the terminal 137 is greater than the lens position signal on the terminal 138, the comparator output signal on the terminal 143 is negative, the solenoid 132 is energized, the plunger 131 is retracted, and the lens 1 is permitted to move downward under the urging of the spring 129. Whenever the lens 1 reaches a position at which the lens position signal catches-up to the mirror position signal, the output signal on the terminal 143 switches to a positive value, the solenoid 132 is deenergized, and the plunger 131 arrests the movement of the lens 1 at a lens position corresponding to the last mirror position at which a greater chip output signal peak occurred.

OPERATION OF THE APPARATUS OF FIGURE 4

Figure 5:
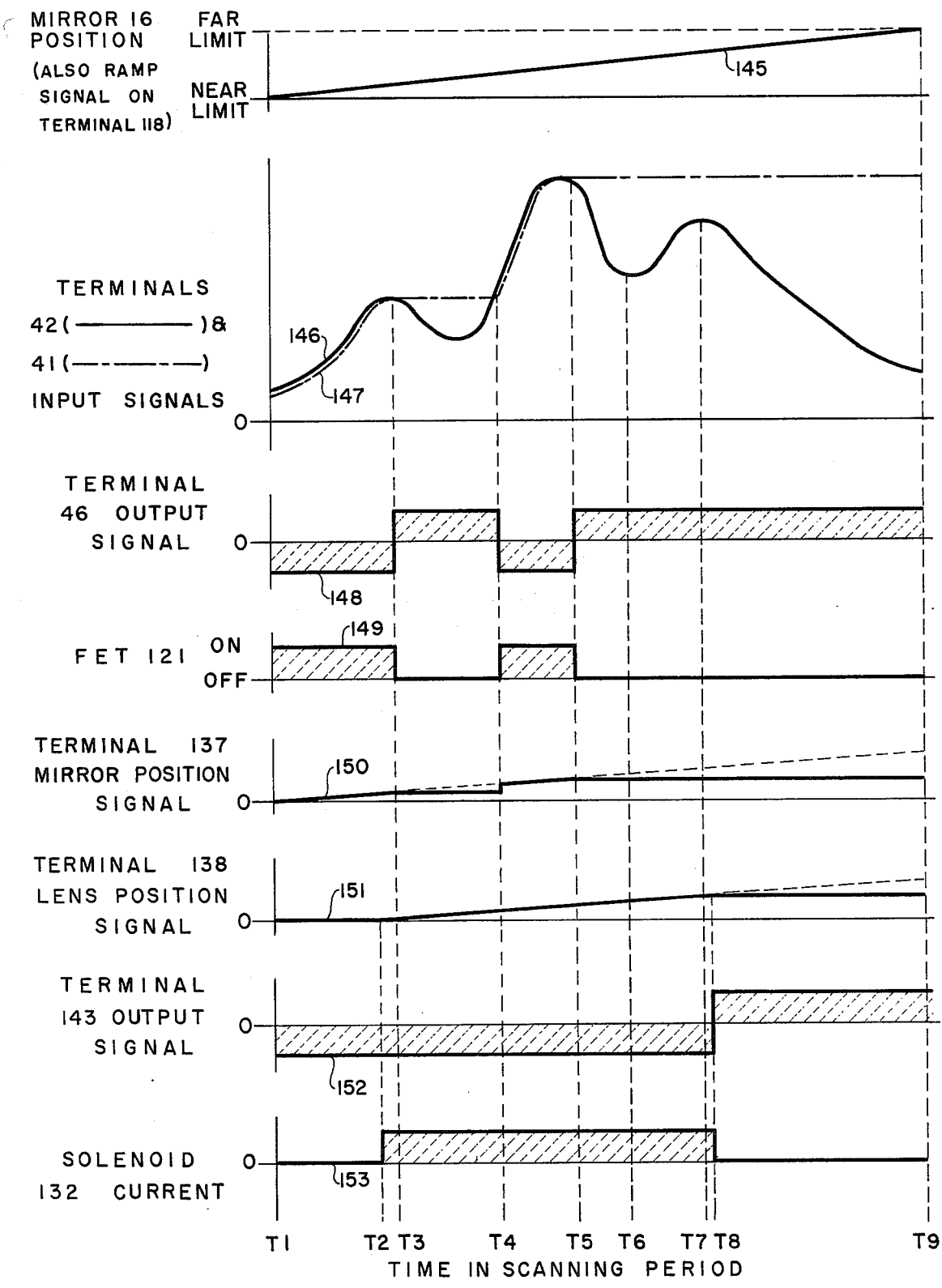
FIG. 5 is an operational curve diagram illustrating the operation of the FIG. 4 and FIG. 6 apparatus for a typical situation.

As in the case of the FIG. 1 apparatus, the manner in which the FIG. 4 apparatus operates will be described by reference to its operation for a typical situation. This typical operation is illustrated by the curves 145 through 153 of the operational curve diagram of FIG. 5. As for the FIG. 1 description, the description which follows is that of the automatic focusing operation which takes place as the camera containing the illustrated apparatus is employed to photograph an object at a distance from the camera of the order of twenty feet. As shown in FIG. 5, this automatic focusing operation is assumed to begin at a time T1, with the scanning period extending to a time T9.

The curves of FIG. 5 show the variations in the position of the mirror 16, and in certain of the signals produced in the FIG. 4 apparatus, which take place during the scanning period of the typical operation being considered. Specifically, the curves 145 through 153 show the variations of the following items with respect to time:

| CURVE | ITEM |
|---|---|
| 145 | position of mirror 16; ramp signal on terminal 118 |
| 146 | chip output signal on terminal 42 |
| 147 | stored signal on terminal 41 |
| 148 | output signal on terminal 46 |
| 149 | conductivity of the FET 121 |
| 150 | mirror position signal on terminal 137 |
| 151 | lens position signal on terminal 138 |
| 152 | comparator output signal on terminal 143 |
| 153 | current in solenoid 132 |

Just prior to the time T1 at which the automatic focusing operation is started, the switch 109 is open, whereby the solenoid 106 is deenergized and causes the plunger 105 to hold the member 100 up in its upper limit position. Consequently, the mirror 16 occupies its near limit position as shown by the curve 145. Also, the switch 120 is held closed, and the ramp signal on the terminal 118 of the integrating amplifier 111 is zero, as is also shown by the curve 145. The switch 48 is open, whereby the chip output signal on the connection 11 and the terminal 42, and the amplifier output signal on the terminal 46, are zero as shown by the respective curves 146 and 148. The switch 44 is closed, whereby the transistor 43 is on and prevents any signal from appearing across the capacitor 40 and on the terminal 41 as shown by the curve 147. The mirror position signal on the terminal 137 is also zero as shown by the curve 150.

Also just prior to the time T1, the lens 1 is in its illustrated near limit position, whereby the lens position signal on the terminal 138 is zero as shown by the curve 151. Consequently, the comparator output signal on the terminal 143 is zero as shown by the curve 152. The switch 134 is open, the solenoid 132 is deenergized, and the plunger 131 engages the teeth of the member 130 and holds the lens 1 in the illustrated position. The absence of current through the solenoid 132 is shown by the curve 153.

At the time T1 at which the operator actuates the camera control to start the automatic focusing operation, such actuation closes the switches 48 and 109, and opens the switch 44. The closure of the switch 109 energizes the solenoid 106 to start the downward movement of the member 100 and the clockwise, scanning rotation of the mirror 16 at the time T1. Accordingly, the mirror 16 proceeds with its scanning movement following the time T1 as shown by the curve 145.

The downward movement of the member 100 causes the switch 120 to open at the time T1. As a result, the ramp signal on the terminal 118 rises from the time T1, following and proportional to the mirror position, as shown by the curve 145.

The closure of the switch 48 at the time T1 powers the chip 8 and the amplifier 36. Consequently, the chip output signal on the connection 11 and on the terminal 42 rises to some initial value at the time T1 as shown by the curve 146.

The opening of the switch 44 at the time T1 turns off the transistor 43 and allows a signal to appear across the capacitor 40 and on the terminal 41. Due to the action of the capacitor 40, the signal on the terminal 41 at the time T1 is less than the signal on the terminal 42, as is shown by the curve 147.

Since the terminal 42 is positive with respect to the terminal 41 at the time T1, a negative output signal appears on the terminal 46 at this time as shown by the curve 148. Consequently, the FET 121 turns on at the time T1 as shown by the curve 149. The FET 121 thus now couples the terminal 118 to the terminal 122, causing the mirror position signal on the terminal 137 to follow the ramp signal and to begin to rise at the time T1. This is shown by the curve 150.

It is assumed that the switch 134 was left open at the time T1. As a result, there is no energization of the solenoid 132 or downward movement of the lens 1 at this time, as shown by the curve 153. Consequently, the lens position signal on the terminal 138 does not change at this time, as shown by the curve 151. However, as noted above, the mirror position signal on the terminal 137 does start to rise at the time T1. At that time, therefore, the comparator output signal on the terminal 143 drops to its negative value as shown by the curve 152. The open condition of the switch 134 at this time prevents the signal on the terminal 143 from energizing the solenoid 132.

As the mirror 16 continues its scanning rotation following the time T1, as shown by the curve 145, the chip output signal on the terminal 42 rises as shown by the curve 146. The signal on the terminal 41 also rises as shown by the curve 147. However, due to the action of the capacitor 40, the signal on the terminal 41 lags the signal on the terminal 42 as shown by the curves 146 and 147. Accordingly, the output signal on the terminal 46 remains at the negative value shown by the curve 148, and the FET 121 remains on as shown by the curve 149.

It is assumed that the camera mechanism causes the switch 134 to close at a time T2. At this time, therefore, the negative signal on the terminal 143 causes the current in the solenoid 132 to rise as shown by the curve 153. This current energizes the solenoid 132, whereby the plunger 131 is withdrawn and allows the spring 129 to start moving the lens 1 downward. As a result, the lens position signal on the terminal 138 starts to rise at the time T2 as shown by the curve 151. Since the mirror position signal on the terminal 137 is ahead of the lens position signal on the terminal 138, the rising lens position signal does not change the output signal on the terminal 143 or the energization of the solenoid 132.

The mirror 16 continues to rotate, the mirror position signal continues to rise, the solenoid 132 remains energized, the lens 1 continues to move, and the lens position signal continues to rise until the rotation of the mirror 16 brings the latter into a position at which the chip output signal experiences a positive peak. This is shown by the curve 146 as occurring at a time T3. This time T3 is actually the time at which the chip output signal on the terminal 42 has just slightly passed its peak value and has started downward, whereby the signal held on the terminal 41 by the capacitor 40 has just become greater than the signal on the terminal 42. As soon as the signal on the terminal 41 so predominates, the output signal on the terminal 46 rapidly switches to a positive value as shown by the curve 148. Consequently, the followig events occur at the time T3:

1. The FET 121 turns off as shown by the curve 149;
2. The mirror position signal on the terminal 137 stops rising, and is held by the capacitor 124 at a value representative of the position of the mirror 16 at which the chip output signal peak occurred; and
3. The energization of the solenoid 132 and the downward movement of the lens 1 continue, it being assumed that the rising lens position signal on the terminal 138 has not as yet caught up to the now held mirror position signal, due to the inertia of the lens structure.

Notwithstanding the detection of the chip output signal peak at the time T3, and the holding of the mirror position signal at a corresponding value, the scanning rotation of the mirror 16 continues. As shown by the curve 146, this continued movement of the mirror 16 causes the chip output signal to decrease to a minimum value and then to start to increase toward the signal of the curve 147 which the capacitor 40 has been holding on the terminal 41. As can be seen from the curves 146 and 147, the signal held by the capacitor 40 represents the peak value which the chip output signal experienced at the time T3. This is made possible by the action of the diode 39.

The increasing chip output signal subsequently exceeds the signal held on the terminal 41. This is shown in FIG. 5 as occurring at a time T4. Up until this time, the signal on the terminal 41 has predominated over the signal on the terminal 42, the output signal on the terminal 46 has been positive, the FET 121 has been off, and the mirror position signal has been held at a value corresponding to the peak-producing position of the mirror 16. The ramp signal on the terminal 118 has, however, continued to follow the mirror position and rise, as shown by the curve 145 and by the dashed line adjacent the curve 150.

At the time T4 at which the signal on the terminal 42 once again just exceeds the signal on the terminal 41, the output signal on the terminal 46 switches to its negative value as shown by the curve 148, and the FET 121 is again turned on as shown by the curve 149. At this time therefore, the mirror position signal quickly rises to the value which it would have had if the FET 121 had remained on during the period between times T3 and T4.

Subsequent to the time T4, the FET 121 remains on and the mirror position signal continues to rise with the ramp signal as shown by the curve 150. This increase in the mirror position signal is appropriate, since it is now apparent that the peak occurring at the time T3 was not the maximum or correlation peak for this scanning period, and that the chip output signal is proceeding to rise to a peak which exceeds the minor peak which occurred at the time T3. It is assumed that the mirror position signal is still ahead of the lens position signal, and that the lens 1 is continuing to move downward toward a focus position for the existing object distance.

The continued scanning rotation of the mirror 16 subsequently brings the latter into a position at which the chip output signal reaches a second peak. This occurs at a time T5. At this time, the signal on the terminal 41 once again exceeds the signal on the terminal 42, the output signal on the terminal 46 shifts to its positive value, the FET 121 is turned off, and the mirror position signal is held at a new value corresponding to the mirror position at which the time T5 peak was produced.

As shown by the curve 146, the continued scanning motion of the mirror 16 causes the chip output signal to dip to a low value at a time T6, to rise to still another minor peak at a time T7, and then to decrease to a final low value at the time T9 which represents the end of the scanning period. Since the chip output signal does not again reach the peak level which it reached at the time T5, as stored on the capacitor 40, the output signal on the terminal 46 remains positive throughout the remainder of the scanning period. Accordingly, the FET 121 remains off, and the mirror position signal is held at the value corresponding to the time T5 peak-producing position of the mirror 16. It is now apparent that the peak which occurred at the time T5 was the maximum and correlation peak, that the corresponding mirror position at the time T5 was the correlation position, and that the held value of the mirror position signal represents the correlation position of the mirror 16 and the existing object distance.

Subsequent to the time T7, the continued downward movement of the lens 1 increases the lens position signal to a value at which this signal just predominates over the held mirror position signal. This is shown in FIG. 5 as occurring at a time T8 which is prior to the end of the scanning period. At the instant at which the lens position signal predominates over the mirror position signal, the output signal on the terminal 143 rapidly shifts to its positive value as shown by the curve 152. This terminates the current flow through the solenoid 132, as shown by the curve 153, whereby the plunger 131 is released and arrests the downward movement of the lens 1. Consequently, the solenoid 132 now holds the lens 1 in a position corresponding to the position of the mirror 16 at which the time T5 peak occurred. Since this mirror position at the time T5 was the correlation position, the corresponding arrested position of the lens 1 is the proper focus position for the existing object distance.

At the completion of the scanning period at the time T9, the camera mechanism may well be automatically actuated to photograph the in-focus image provided by the properly positioned lens 1. Subsequently the lens 1 is returned to its near limit position by suitable means, not shown. Also, the member 100 is returned to its upper limit position. The switches 48, 109, and 134 are now opened, and the switches 44 and 120 are closed, awaiting the next automatic focusing operation.

The foregoing description of the typical operation of the FIG. 4 apparatus illustrates the manner in which this apparatus causes the mirror position signal to be held at values corresponding to each position of the mirror 16 at which each greater chip output signal peak occurs. It has also been shown how that the last of these held mirror position signal values represents the correlation position of the mirror 16 and the existing object distance, and how that the lens 1 is placed in a corresponding position at which a properly focused image is produced for this existing object distance.

In the typical operation of the FIG. 4 apparatus described above, it was assumed that the switch 134 was closed early in the scanning period. It is noted however, that the closure of the switch 134 could be made at any desired time in the scanning period, and could, in fact, be delayed until the end of the scanning period. Also, it is conceivable that the lens 1 would, in practice, move more rapidly than has been assumed for the described typical operation. Such faster motion of the lens 1 would merely cause the lens to be temporarily arrested in one or more intermediate positions before being stopped in its final focus position. Similarly, the lens 1 may move more slowly than has been assumed above.

It is noted further that the basic operation of either the apparatus of FIG. 1 or the apparatus of FIG. 4 is the same as that described above no matter how many minor peaks occur in each scanning period, and no matter in what order such peaks occur. It should be clear also that the typical operation which has been described applies as well for object distances other than the assumed object distance of the order of twenty feet.

THE APPARATUS OF FIG. 6

Figure 6:
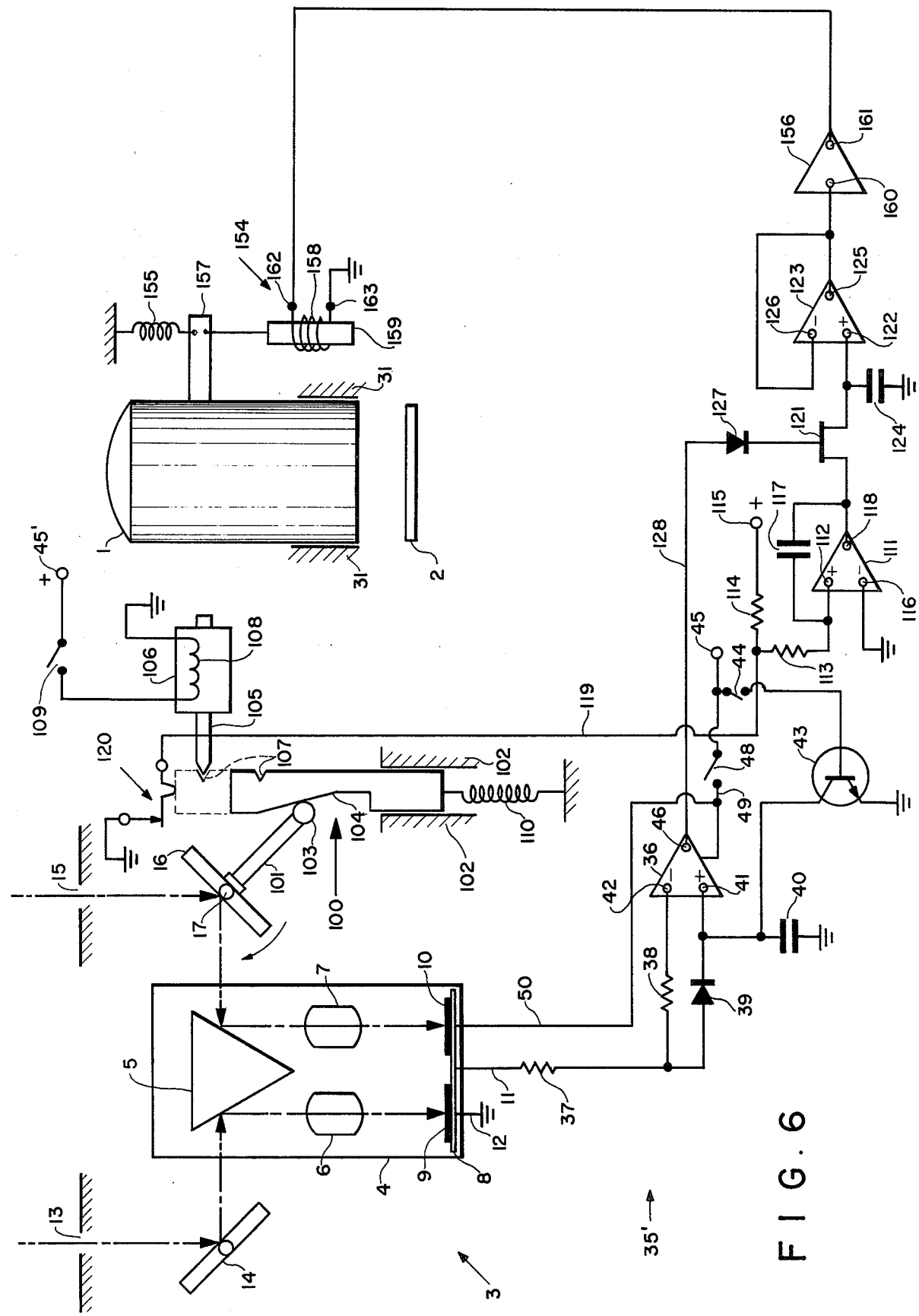
FIGS. 6, 7, and 8 are diagrammatic representations of other modified forms of the FIG. 1 apparatus.

FIG. 6 shows a modified form of the FIG. 4 apparatus which includes a different form for the control means which position the lens 1. In the FIG. 6 apparatus, the control means continuously place and hold the lens 1 in a position corresponding to the value of the mirror position signal. Consequently, the lens 1 is successively placed and held in positions corresponding to the positions of the mirror 16 at which each greater peak in the chip output signal is produced. Briefly, this is accomplished in the FIG. 6 apparatus by the use of a linear actuator 154 which holds the lens 1 away from its illustrated near limit position by an amount which is proportional to the value of the mirror position signal, whereby the final position of the lens 1 at the end of a scanning period corresponds to the correlation position of the mirror 16 and to the existing object distance.

In accordance with the foregoing, the FIG. 6 apparatus includes the lens 1 and its guide means 31, the plane 2, the image correlation portion 3, the scanning means including the member 100, the selective means 35', and the responsive means including the ramp signal generating and gating arrangement which produces the mirror ramp signal on the amplifier output terminal 118 and the mirror position signal on the amplifier output terminal 125.

The novel control means of the FIG. 6 apparatus include, in addition to the linear actuator 154, a tension spring 155 and a power amplifier 156. The spring 155 is attached to a member 157 on the lens 1 and normally maintains the latter at its illustrated fully out or near limit position. The linear actuator 154 has a coil 158 and an armature 159. The latter is attached to the member 157 in such a manner that the energization of the coil 158 pulls the lens 1 down from its near limit position.

The input terminal 160 of the amplifier 156 is connected to the amplifier output terminal 125 to receive the mirror position signal, and the output terminal 161 of the amplifier 156 is connected to one end terminal 162 of the coil 158. The remaining end terminal 163 of the coil 158 is connected to ground. This construction is such that the armature 159 pulls the lens 1 down from its near limit position, against the urging of the spring 155, by an amount which is proportional to the mirror position signal applied to the amplifier input terminal 160. Stated differently, each value of the mirror position signal causes the armature 159 to pull the lens 1 down to a corresponding position, this position being the one at which the forces exerted by the armature 159 and the spring 155 just balance each other.

Consequently, as each of the successive greater chip output signals holds the mirror position signal at a new higher value proportional to the corresponding mirror position, the lens 1 is held in a balanced position which is proportional to that mirror position. The mirror 16 and the lens 1 are so relatively arranged that each of these proportional balanced positions of the lens 1 is the focus position for the object distance represented by the corresponding mirror position. In this way, the final balanced position of the lens 1 is the focus position for the existing object distance.

OPERATION OF THE APPARATUS OF FIG. 6

The operation of the FIG. 6 apparatus is essentially the same as the above-described operation of the FIG. 4 apparatus, except with respect to the operation of the means for positioning the lens 1. Accordingly, the following description is based on the said description of the operation of the FIG. 4 apparatus, and is thus based on the operating example illustrated by the curves of FIG. 5. However, only curves 145 through 150 of FIG. 5 apply to the forthcoming description of the FIG. 6 apparatus operation, since the FIG. 6 apparatus does not require, and hence does not include, any means for producing the lens position signal of the curve 151, the comparator output signal of the curve 152, or the solenoid current of the curve 153. Instead, with respect to the FIG. 6 apparatus, the curve 150 illustrates the variations with time of both the mirror position signal and the current through the coil 158. The curve 150 also illustrates the position of the lens 1 with respect to its near limit position.

With the foregoing in mind, it is seen that the closure of the switches 48 and 109 and the opening of the switch 44 at the time T1 cause the mirror 16 of the FIG. 6 apparatus to start its scanning rotation, and cause the various signals of the FIG. 6 apparatus to assume the values illustrated by the curves 145 through 150 of FIG. 5. Also at the time T1, the appearance of the mirror position signal and the resulting current in the actuator coil 158, shown by the curve 150, cause the lens 1 to start to move downward from its illustrated near limit position which it occupies prior to the time T1 and the closure of the switches 48 and 109.

Immediately following the time T1, the position of the lens 1 proportionally follows the ramp signal on the terminal 118, the mirror position signal on the terminals 125 and 160, and the position of the moving mirror 16. This proportional movement of the lens 1 and the mirror 16 continue until the time T3 at which the first peak appears in the chip output signal as shown by the curve 146. This peak causes the output signal on the terminal 46 to shift to its positive value as shown by the curve 148, whereby the FET 121 is turned off as shown by the curve 149. This turn off of the FET 121 causes the signal on the capacitor 124, the mirror position signal on the terminal 160, the current in the coil 158, and the position of the lens 1 to be held at the values which they have for the position of the mirror 16 at which the chip output signal peak occurs, all as shown by the curve 150. Under this condition, the force exerted by the coil 158 is just balanced by the force exerted by the spring 155, so that the lens 1 is maintained in the position corresponding to the peak-producing position of the mirror 16.

The foregoing conditions obtain until the time T4 at which the output signal on the terminal 46 goes negative and the FET 121 turns on. At this time, the mirror position signal and the position of the lens 1 catch up to the position of the mirror 16 and again follow that position. This action continues until the time T5 at which the next greater chip output signal peak occurs and turns off the FET 121, leaving the lens 1 in a position corresponding to the new held value of the mirror position signal and to the peak-producing position of the mirror 16. Since there are no further chip output signal peaks which are greater than that occurring at the time T5, there is no further movement of the lens 1 in the remainder of the scanning period.

Accordingly, at the end of the scanning period, the position of the lens 1 corresponds to the last value of the mirror position signal, and hence to the mirror position corresponding to the last greater peak of the chip output signal, which is the maximum or correlation peak. Since the focus position for the lens 1 moves away from the near limit position in proportion to the distance which the mirror 16 is away from its near limit position, the noted final position of the lens 1 is its focus position for the existing object distance.

It has been assumed in connection with the foregoing description that the lens 1 is able to keep up with the changing value of the mirror position signal, the changing current in the coil 158, and the changing position of the mirror 16. In practice, however, it may be found that the position of the lens 1 will somewhat lag the corresponding mirror position, due to the inertia of the lens structure. This would not prevent the apparatus from operating in a satisfactory manner, however, since the only meaningful position of the lens 1 is that which it finally occupies following the end of the scanning period.

The foregoing description of the typical operation of the FIG. 6 apparatus illustrates the manner in which this apparatus causes the position of the lens 1 to follow those positions of the mirror 16 at which each greater chip output signal peak occurs. It has also been shown how that the last of these lens positions corresponds to the correlation position of the mirror 16 and to the existing object distance, whereby this final position of the lens 1 produces a properly focused image of the object for this existing object distance.

THE APPARATUS OF FIG. 7

Figure 7:
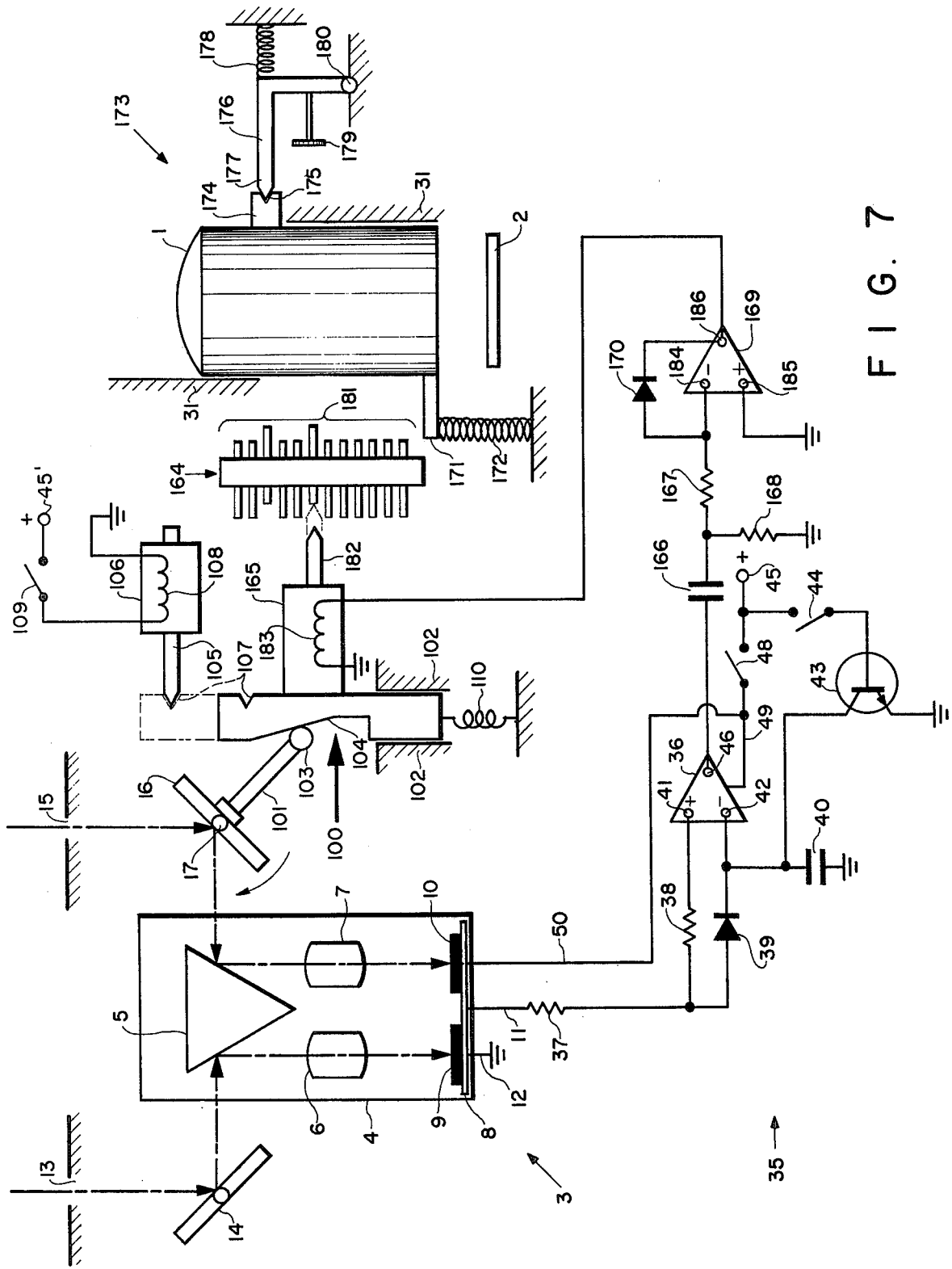

FIG. 7 shows a modified form of the FIG. 4 apparatus which includes a different form of the responsive means for providing a measure of the mirror positions at which the greater chip output signal peaks occur. The FIG. 7 apparatus also includes a different form of the control means for positioning the lens 1 in a manner dictated by the mirror position measures provided by the responsive means. As to the portions of the FIG. 7 apparatus which are the same as those of previous figures, the FIG. 7 apparatus includes the lens 1 and its guide means 31, the plane 2, the image correlation portion 3, the scanning means including the member 100, and the selective means 35 of FIG. 1 including the elements 36 through 46, and 48 through 50.

The novel responsive means of the FIG. 7 apparatus include a pin assembly 164, and include a solenoid 165 which is carried by the member 100 and thus moves up and down with the latter. The FIG. 7 apparatus also includes a pulse forming circuit including a capacitor 166, resistors 167 and 168, an operational amplifier 169, and a diode 170.

The control means of the FIG. 7 apparatus include a member 171 which projects from the lower portion of the lens 1, and include a compression spring 172 which bears on the member 171. The lens 1 is also provided with a releaseable latching means 173 which include a member 174. The latter is fastened to the lens 1 and contains a notch 175. A lever 176 has a pointed end 177 which is urged into the notch 175 by a compression spring 178. The lever 176 is provided with a lens-releasing button 179 and is pivoted at a point 180.

The position of the lens 1 shown in FIG. 7 is its far limit or infinity position, at which it is fully in with respect to the image plane 2 of the camera. The spring 172 exerts an upward force on the member 171 in a direction to move the lens 1 upward through its range of focusing positions to its near limit or fully extended position. However, such movement is normally prevented by the presence of the lever end 177 in the notch 175.

The assembly 164 includes twelve equally spaced settable pins 181 which lie in a row as shown in FIG. 7. Each of these pins is adjustable between a retracted position, in which most of the pin extends from the left of the assembly, and a set position, in which most of the pin extends from the right of the assembly. In FIG. 7, counting from top to bottom, the first, second, fourth, fifth, and seventh through twelve pins are shown in their retracted positions, while the third and sixth pins are shown in their set positions.

Each of the pins 181 remains in the position in which it is placed until it is moved to its other position. Pin resetting means, not shown, would be provided to place all of the pins 181 in their retracted positions prior to the start of each scanning period.

The solenoid 165 is provided with a plunger 182 which assumes its retracted position whenever the winding 183 of the solenoid is not energized. This retracted position of the plunger 182 is shown in solid lines in FIG. 7. Whenever the winding 183 is energized, the plunger 182 moves out to the right to its extended position. This position is shown by the dashed lines in FIG. 7.

The pin assembly 164 lies along a line which is parallel to the paths of motion of the member 100, the solenoid 165, and the lens member 171. The relative orientations of the member 100, the assembly 164, and the lens 1 are such that:

1. When the mirror 16 is in its near limit position, the plunger 182 is in register with the uppermost pin 181;
2. As the mirror 16 rotates clockwise in its scanning travel, the solenoid 165 and its plunger 182 move downward proportionally into register with one after the other of the pins 181;
3. When the mirror 16 is in its far limit position, the plunger 182 is in register with the lowermost pin 181;
4. As the plunger 182 passes through a position of register with any pin, it moves that pin into its set position if the solenoid 165 is energized at that time. If the solenoid 165 is not energized at that time, the plunger 182 merely passes by that pin without affecting its position; and
5. When it is desired to have the lens 1 move into its focus position, the button 179 is pushed to the right to remove the lever end 177 from the notch 175. When this occurs, the spring 172 moves the lens 1 upward from its illustrated far limit position toward its uppermost or near limit position. As the spring 172 so moves the lens 1 upward, the member 171 moves upward from a position below the lowermost pin 181, and moves past each retracted pin until it encounters a pin which is in its set position. Such a set pin arrests the movement of the lens 1.

As will be explained more fully hereinafter, the first set pin 181 which the member 171 so encounters, and which determines the stopped position of the lens 1, is the last pin to have been set in the scanning period, and represents the last position of the mirror 16 at which a greater chip output signal peak occurred. Therefore, said stopped position of the lens 1 is a measure of the existing object distance, and is the focus position of the lens 1 for that distance.

The positions in which the member 100 and its associated elements are shown in FIG. 7 are their positions at a specific time during a scanning period. This time is that at which the plunger 182 is in a position to set the sixth pin 181, as will be explained more fully hereinafter.

In the pulse forming circuit of the FIG. 7 apparatus, the output terminal 46 of the amplifier 36 is connected through the capacitor 166 and the resistor 167 to the inverting input terminal 184 of the amplifier 169. The junction between the capacitor 166 and the resistor 167 is connected to ground through the resistor 168. The non-inverting input terminal 185 of the amplifier 169 is connected to ground. The output terminal 186 of the amplifier 169 is connected to one end of the solenoid winding 183, the other end of which is connected to ground. The anode of the diode 170 is connected to the input terminal 184, and the cathode of the diode 170 is connected to the output terminal 186. This construction is such that the amplifier 169 supplies an energizing current pulse to the solenoid 165, to momentarily move the plunger 182 into its extended, pin setting position, only upon each occurrence of a greater chip output signal peak and a corresponding negative swing in the output signal on the terminal 46.

OPERATION OF THE APPARATUS OF FIG. 7

The operation of the FIG. 7 apparatus is essentially the same as the operation of the other apparatus forms which has already been described, except with respect to the specific operation of the responsive means and the lens-positioning control means. This operation will be described on the basis of the typical situation which is illustrated by the curves of FIG. 3. However, only curves 95 through 98 of FIG. 3 apply to the forthcoming description of the FIG. 7 apparatus operation, since the FIG. 7 apparatus does not include the FIG. 1 solenoid 29, and hence has no solenoid current as represented by the FIG. 3 curve 99. FIG. 3 does include, however, an additional curve 187 which shows the variations with respect to time of the pin setting current which is caused to flow in the winding 183 of the solenoid 165.

Just prior to the time T1 at which the automatic focusing operation of the FIG. 7 apparatus is started, the switch 109 is open, whereby the solenoid 106 holds the member 100 in its upper limit position. As a result, the mirror 16 is in its near limit position, and the plunger 182 of the solenoid 165 is adjacent to the uppermost pin 181. The switch 48 also is open, and the switch 44 is closed, whereby the signals on the terminals 41, 42, and 46 have the values shown by the respective curves 96, 97, and 98. Since there is no signal on the amplifier output terminal 46, there is no current in the solenoid 165 as shown by the curve 187. Therefore, the plunger 182 is in its retracted position. At this time, the latching means 173 holds the lens 1 down in its illustrated far limit position.

At the time T1, the switches 48 and 109 are closed, and the switch 44 is opened. Consequently, at the time T1, the mirror 16 begins its scanning motion as shown by the curve 95, and the signals on the terminals 41, 42, and 46 rise to the values shown by the respective curves 96, 97, and 98. There is still no current produced in the solenoid 165, as shown by the curve 187, since a positive-going signal on the terminal 46 does not produce a signal on the amplifier output terminal 186.

As the mirror 16 continues its scanning rotation following the time T1, as shown by the curve 95, the solenoid 165 and its retracted plunger 182 move proportionally downward. At the time T2, at which the first peak in the chip output signal occurs, the signal on the amplifier output terminal 46 drops to its negative value as shown by the curve 98. In response to this negative-going signal, a positive pulse appears at the amplifier output terminal 186 which momentarily energizes the solenoid 165 as shown by the curve 187.

It is assumed that, at the time T2, the plunger 182 is in register with the pin 181 which is the third from the top of the assembly 164. The noted momentary energization of the solenoid 165 at the time T2 therefore moves this third pin to its set position shown in FIG. 7. Accordingly, the location of this set pin along the row of pins provides a measure of the position of the mirror 16 at which the time T2 greater chip output signal peak occurred.

As the mirror 16 and the solenoid 165 continue to have their corresponding scanning movements, the plunger 182 remains retracted until the time T4 at which the second peak occurs in the chip output signal. Since this peak is greater than the first peak, the signal on the terminal 46 again swings negative at the time T4 as shown by the curve 98. Consequently, the solenoid 165 receives a pulse of current at the time T4 as shown by the curve 187.

It is assumed that, by the time T4, the downward movement of the solenoid 165 has brought the plunger 182 into register with the sixth pin 181. The momentary energization of the solenoid 165 at the time T4 thus sets this sixth pin, as shown in FIG. 7. The location of this set pin provides a measure of the position of the mirror 16 at which the greater chip output signal peak of the time T4 occurred.

The mirror 16 and the solenoid continue to move down until the end of the scanning period at the time T7. Since there are no more greater chip output signal peaks following the time T4, there is no further energization of the solenoid 165 and no further setting of any of the pins 181. Thus, the sixth pin 181 is the last to be set in this scanning period. Since the location of this last set pin is proportional to the mirror position corresponding to the maximum or correlation peak of the chip output signal, this pin location is a measure of the existing object distance.

Following the time T7, the button 179 is actuated, either manually or automatically, to release the lens 1. The latter now moves upward from its illustrated far limit position until the member 171 strikes the first set pin 181 which the member 171 encounters. As can be seen from FIG. 7, this pin is the noted sixth pin, which was the last pin to be set during the scanning period. As soon as the member 171 strikes this set pin, the upward movement of the lens 1 is terminated.

Since the position of this last set pin is a measure of the distance which the mirror 16 moved to arrive at its correlation position, the distance which the lens 1 moves to its stopped position is also a measure of the distance which the mirror 16 moved to arrive at its correlation position. Consequently, the stopped position of the lens 1 is a measure of the existing object distance, and the illustrated construction causes this stopped position to be the focus position for this object distance.

After the set sixth pin 181 has stopped the lens 1 in its proper focus position, the camera mechanism may well be automatically actuated to photograph the in-focus image provided by the properly positioned lens 1. Subsequently, the lens 1 is returned to its illustrated far limit position by suitable means, not shown. It is assumed that this means also returns the member 100 to its upper limit position, and returns the set ones of the pins 181 to their retracted positions.

The foregoing description of the operation of the FIG. 7 apparatus for the typical situation considered shows that, for each scanning period, the plunger 182 is moved along the row of pins 181 in proportion to the scanning movement of the mirror 16. As long as the plunger 182 is retracted, it does not set any of the pins 181. The plunger 182 is moved out of its retracted position into its extended position only upon each occurrence of a greater peak in the chip output signal. When such a peak causes the plunger 182 to move into its extended position, the plunger sets the pin with which it is then in register. Due to the proportional movement of the mirror 16 and the plunger 182, the position of the pin so set corresponds to the position of the mirror 16 at which the greater chip output signal peak occurs. The lowermost or last pin to be so set in the scanning period represents the correlation position of the mirror 16, and is at a location or distance from the top of the assembly 164 which is proportional to the mirror correlation position.

When the lens 1 is subsequently moved so that the member 171 traverses the row of pins 181 in a direction opposite to that in which the plunger 182 is moved in its scanning and pin setting motion, the lens 1 is arrested and held at the position of the first set pin which it encounters, which is the last pin to be set during the scanning period. As a result, the position at which the lens 1 is stopped is the focus position for the existing object distance.

Although the FIG. 7 apparatus has been illustrated as including twelve pins in the assembly 164, it is to be understood that a larger or smaller number of pins may be employed in practice, depending upon the accuracy of focus which is desired and the number of focus zones between which the apparatus is capable of discriminating.

THE APPARATUS OF FIG. 8

Figure 8:
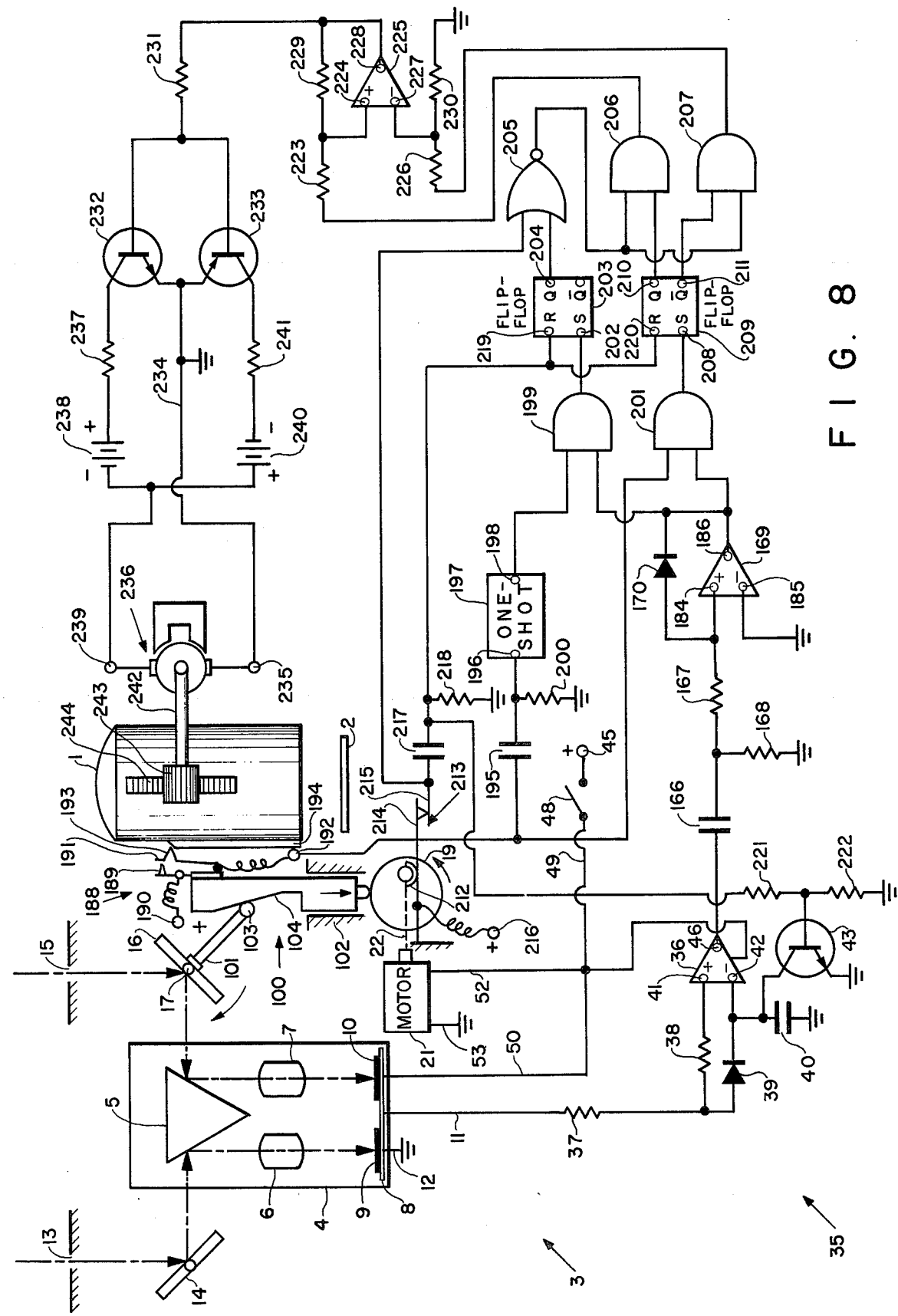

FIG. 8 shows a modified form of the previously described apparatus which is arranged to operate continuously. The FIG. 8 apparatus is thus arranged to provide the continuous automatic focusing positioning of a camera lens which is required when photographs are to be made at a rapid rate, as occurs in a motor-driven still camera and in a motion picture camera, for example.

The FIG. 8 apparatus includes several elements and portions which are the same as those included in the previously described apparatus. Specifically, the FIG. 8 apparatus includes the lens 1, the plane 2, the image correlation portion 3, the cam 19 driven by the motor 21, the selective means 35, the scanning member 100 with its cooperating mirror arm 101 and guide means 102, and the pulse-producing means including the elements 166 through 170. As before, the last mentioned elements are connected to the output terminal 46 of the selective means 35 to provide a positive pulse on the output terminal 186 for each greater chip output signal peak in each scanning period.

The scanning, responsive, and control portions of the FIG. 8 apparatus are of a somewhat different form from those which are included in the previously described apparatus. Specifically, in the FIG. 8 apparatus, the lower end of the member 100 is maintained in contact with the periphery of the cam 19, and the latter is continuously rotated in the indicated counter-clockwise direction as long as the apparatus is in its operating condition. To this end, the energizing conductor 52 of the motor 21 is connected to the supply conductor 49.

Because of the construction as just described, the member 100 is continuously moved alternately up and down, within its guide means 102, between its upper limit and lower limit positions. Consequently, the mirror 16 is continously rotated back and forth between its near limit and far limit positions, whereby its scanning movement from its near limit position to its far limit position is cyclically repeated. Thus, the scanning means of the FIG. 8 apparatus continuously produces cyclically repeated scanning periods as long as the apparatus is energized to be operative.

The construction of the FIG. 8 scanning means is such that, for the first 180° of each revolution of the cam 19 from its highest position, the member 100 moves from its upper limit position to its lower limit position, and the mirror 16 moves from its near limit position to its far limit position. This first 180° of rotation of the cam 19 thus establish the scanning period of the apparatus. For the remaining 180° of each revolution of the cam 19, the latter moves the member 100 back up to its upper limit position, and returns the mirror 16 to its near limit position. The mirror is then ready for the start of the next scanning period, which follows immediately. The positions of the cam 19, the member 100, and the mirror 16 which are illustrated in FIG. 8 are the positions which these elements have at approximately the middle of a scanning period.

The responsive and control means of the FIG. 8 apparatus include a switch 188 which is carried by the member 100 and which thus moves alternately up and down with the latter. The switch 188 has a fixed contact 189 which is connected to a positive supply terminal 190 which, in turn, may be connected to the same source as that to which the terminal 45 is connected. The switch 188 also has a movable contact 191 which is connected to a terminal 192.

The switch contact 191 has a projection 193 which cooperates with a projection 194 on the lens 1. This construction is such that the contacts of the switch 188 are closed at a time after the start of each scanning period which is proportional to the concurrent position of the lens 1 in its range of travel. Thus, when the lens 1 is up at its near limit position, the contacts 189 and 191 close just after the start of the scanning period. Conversely, when the lens 1 is down at its far limit position, the contacts 189 and 191 do not close until close to the end of the scanning period.

The foregoing construction is also such that, once the contacts of the switch 188 are so closed in a scanning period, these contacts remain closed for the remainder of that period. The portion of each scanning period during which the switch 188 is closed is referred to hereinafter as the switch 188 closure period. In FIG. 8, the lens 1 is shown in a position which is approximately midway between its near limit and far limit positions.

It is noted that, if desired, the positions of the switch 188 and the projection 194 can be reversed, so that the lens 1 carries the switch 188, and the member 100 carries the projection 194.

The switch terminal 192 is connected through a capacitor 195 to the trigger terminal 196 of a one-shot 197. The output terminal 198 of the latter is connected to the upper input of an AND gate 199. A resistor 200 is connected between the one-shot input terminal 196 and ground. This construction causes the one-shot 197 to turn on, and to apply a logic 1 to the upper input of the AND gate 199, for a time period which starts with each closure of the switch 188. The length of this period or on time of the one-shot 197 is made to be of the order of 5% to 10% of the scanning period.

The construction which has just been described causes each switch 188 closure period to be divided into two parts or zones. The first of these zones is a relatively narrow time slot which corresponds to the on time of the one-shot 197. The second of these zones is the remainder of that switch 188 closure period, and extends to the end of the corresponding scanning period.

The switch terminal 192 is also connected to the upper input of an AND gate 201. The lower inputs of each of the AND gates 199 and 201 are connected to the output terminal 186 of the amplifier 169 to receive the pulses representing the positions of the mirror 16 at which each greater chip output signal peak is produced.

The output of the AND gate 199 is connected to the SET terminal 202 of an RS flip-flop 203. The Q output terminal 204 of the latter is connected to the lower input of a NOR gate 205. The output of the latter is connected to the upper input of an AND gate 206, and to the lower input of an AND gate 207.

The output of the AND gate 201 is connected to the SET terminal 208 of an RS flip-flop 209. The Q output terminal 210 of the latter is connected to the lower input of the AND gate 206. The Q output terminal 211 of the flip-flop 209 is connected to the upper input of the AND gate 207.

In the FIG. 8 apparatus, the difference between the existing position of the lens 1 and its proper focus position is effectively determined during each scanning period. In the alternate periods in which the mirror 16 is being returned to its near limit position, the lens 1 is moved in the direction to eliminate any such difference. To this end, the motor shaft 22 carries an additional cam 212 which cooperates with a switch 213. The latter has a movable contact 214 and a fixed contact 215. The cam 212 holds the contacts 214 and 215 in engagement throughout each scanning period, and causes these contacts to be separated throughout each mirror return period. The contact 214 is connected to a positive supply terminal 216 which, in turn, may be connected to the same source as that to which the terminal 45 is connected.

The switch contact 215 is connected to the upper input of the NOR gate 205. Consequently, the output of the NOR gate 205 is held at logic O throughout each scanning period. The contact 215 is also connected through a capacitor 217 and a resistor 218 to ground. The junction between the capacitor 217 and the resistor 218 is connected to the RESET terminal 219 of the flip-flop 203, and to the RESET terminal 220 of the flip-flop 209. As a result, at the start of each scanning period, the concurrent closure of the contacts 214 and 215 applies a momentary resetting pulse to each of the flip-flops 203 and 209.

The junction between the capacitor 217 and the resistor 218 is also connected through a resistor 221 to the base of the capacitor-resetting transistor 43. This base is also connected to ground through a resistor 222. Consequently, at the start of each scanning period, the concurrent closure of the switch contacts 214 and 215 applies a momentary pulse to the base of the transistor 43. This pulse momentarily turns on the transistor as necessary to discharge and hence reset the capacitor 40, to ready it for the forthcoming scanning period. This construction replaces the previously described switch 44.

The output of the AND gate 206 is connected through a resistor 223 to the non-inverting input terminal 224 of an operational amplifier 225. Similarly, the output of the AND gate 207 is connected through a resistor 226 to the inverting input terminal 227 of the amplifier 225. The output terminal 228 of the amplifier 225 is connected through a feedback resistor 229 to the input terminal 224. The input terminal 227 is connected to ground through a resistor 230.

The amplifier output terminal 228 is also connected through a resistor 231 to the base of an NPN transistor 232 and to the base of a PNP transistor 233. The emitters of these two transistors are connected together and to a grounded conductor 234 which, in turn, is connected to one energizing terminal 235 of a reversible motor 236. The collector of the transistor 232 is connected through a resistor 237 to the positive terminal of an ungrounded power source, shown as a battery 238. The negative terminal of the latter is connected to the remaining energizing terminal 239 of the motor 236. The latter terminal is also connected to the positive terminal of another ungrounded power source, shown as a battery 240. The negative terminal of the latter is connected through a resistor 241 to the collector of the transistor 233. The motor 236 has a shaft 242 which carries a pinion 243. The latter is maintained in engagement with a rack 244 which is mounted on the lens 1.

The construction which has just been described is such that, when the output of the AND gate 206 is at logic 1, the transistor 232 is turned on and causes the motor 236 to move the lens 1 in the downward direction toward its far limit position. Similarly, a logic 1 output from the AND gate 207 turns on the transistor 233, which then causes the motor 236 to move the lens 1 in the upward direction toward its near limit position. When the outputs of the AND gates 206 and 207 are both at logic 0, the motor 236 remains stationary.

OPERATION OF THE APPARATUS OF FIG. 8

The manner in which the FIG. 8 apparatus operates will be described by reference to its operation for the assumed object distance which is illustrated by the curves of FIG. 3. It is assumed that, throughout the operation which is to be described, this object distance remains constant. Consequently, it is further assumed that the actions and the scanning period T1-T7 which are depicted by the FIG. 3 curves are cyclically repeated throughout this described operation.

In regard to the FIG. 3 curves, it is noted that only the curves 95 through 98 apply to the operation of the FIG. 8 apparatus. This is so because of the absence from that apparatus of either of the solenoids 29 and 165, and the resulting absence of any currents corresponding to those represented by the curves 99 and 187.

In the description of the operation of the FIG. 8 apparatus which is to follow, the curves 95 through 98 of FIG. 3 are supplemented by additional curves which are shown in FIG. 9. That figure includes four portions A, B, C, and D. Each of those portions pertains to a different one of the scanning periods T1-T7 which occurs at a corresponding different time and for a corresponding different operating condition. Specifically, the portion A pertains to a one of the scanning periods in which the lens 1 is too far out for the existing object distance, while the portion B pertains to a subsequent scanning period by which the lens 1 has been moved down into its focus position for the existing object distance. The portion C pertains to another scanning period in which the lens 1 is too far in for the existing object distance, while the portion D pertains to a subsequent scanning period by which the lens 1 has been moved out into its focus position for the existing object distance.

Each of the four portions A, B, C, and D of FIG. 9 includes a curve 245. This curve, in each of said portions, shows the variations which occur in the pulse output signal on the output terminal 186 of the amplifier 169 during the scanning period T1-T7 for the particular object distance represented by the FIG. 3 curve 96. Specifically, the curve 245 shows the pulses which are produced at the times T2 and T4 of each scanning period because of the occurrence at those times of a greater chip output signal peak.

Each of the portions A, B, C, and D also includes a respective one of narrow shaded areas or zones 246, 247, 248, and 249. Each of these zones represents the aforementioned first zone or time slot of the corresponding switch 188 closure period. Thus, each of these zones represents the time period, in the corresponding scanning period, in which the one-shot 197 is on following the closure of the switch 188.

Each of the portions A, B, C, and D further includes a respective one of shaded areas or zones 250, 251, 252, and 253. Each of these zones represents the aforementioned second zone which corresponds to the portion of the corresponding scanning period during which the switch 188 remains closed but the one-shot 197 is off. Consequently, the total shaded area in each of the portions A, B, C, and D represents the switch 188 closure period for the corresponding scanning period. Thus, the distance represented by the time from the time T1 to the time at which the shaded area appears along each of the curves 245 represents the concurrent or existing position of the lens 1 in the corresponding scanning period.

When it is desired to start the automatic focusing operation of the apparatus of FIG. 8, the switch 48 is closed to energize the several circuit portions and the motor 21. Thereafter, the apparatus proceeds to execute one after another of the scanning periods T1-T7, in each of which the apparatus operates as shown by the curves 95 through 98 and 245.

At the starting time T1 of each of the scanning periods which is produced by the FIG. 8 apparatus, the following conditions exist:

1. The member 100 and the switch 188 start to move downward from their upper limit positions, and the mirror 16 starts to rotate clockwise from its near limit position as shown by the curve 95;

2. The cam 212 closes the previously open switch 213 to remove any charge from the capacitor 40, to reset the flip-flops 203 and 209, and to lock the output of the NOR gate 205 to logic 0. This latter action disables both of the AND gates 206 and 207 throughout the scanning periods, so as to restrict the movement of the lens 1 to the mirror return periods as noted above;

3. The switch 188 is open, whereby the one-shot 197 is off and the upper input of the AND gate 199 is at logic 0. Also, the upper input of the AND gate 201 is at logic 0. Consequently, the outputs of the AND gates 199 and 201 are at logic 0, the flip-flop 203 applies a logic 0 to the lower input of the NOR gate 205, and the flip-flop 209 applies a logic 0 to the lower input of the AND gate 206 and applies a logic 1 to the upper input of the AND gate 207. This does not turn on the AND gate 207, however, since the latter is disabled by the NOR gate 205 as noted above; and 4. The signals on the terminals 41, 42, and 46 assume the values shown by the respective curves 96, 97, and 98. The positive signal on the output terminal 46 leaves the signal on the output terminal 186 at zero as shown by the curve 245. As a result, a logic 0 is applied to the lower input of each of the AND gates 199 and 201.

Let it be assumed that the situation which exists for the first scanning period of the operation being considered is the situation which is illustrated in the portion A of FIG. 9. As previously noted, the position of the lens 1 in this particular scanning period is such that the lens 1 is too far out - that is, is in its focus position for an object distance which is less than the existing object distance.

As the scanning period of portion A proceeds following the time T1, the member 100 and the mirror 61 proceed with their scanning movements as shown by the curve 95, and the signals on the terminals 41, 42, 46, and 186 have the values represented by the respective curves 96, 97, 98, and 245. As this operation continues, the chip output signal peak occurs at the time T2 as shown by the curve 96. This peak causes the signal on the output terminal 46 to swing negative as shown by the curve 98, and this, in turn, causes a positive pulse to appear on the output terminal 186 as shown by the curve 245. This pulse is applied as a momentary logic 1 to the lower input of each of the AND gates 199 and 201. The outputs of these gates remain at logic 0, however, since the switch 188 has not as yet been closed. Accordingly, the occurrence of the chip output signal peak at the time T2 does not change the condition of the FIG. 8 apparatus.

As the scanning period proceeds, the downward movement of the member 100 causes the switch projection 193 to strike the lens projection 194. This, in turn, causes the contacts 189 and 191 of the switch 188 to close, starting the switch 188 closure period for this scanning period. This closure is shown in portion A of FIG. 9 as occurring at a time T2A, and is represented by the left-hand edge or beginning of the first zone 246.

The closure of the switch 188 at the time T2A causes the terminal 192 to become positive and hence to be at logic 1. This produces the following results:

1. The capacitor 195 supplies a triggering pulse to the terminal 196 of the one-shot 197. This starts the on period of the one-shot, and causes the latter to put a logic 1 on the upper input of the AND gate 199. The output of the latter remains at logic 0, however, since there is still a logic 0 on the lower input of this AND gate at this time; and 2. A logic 1 is applied to the upper input of the AND gate 201. The output of the latter remains at logic 0, however, since there is still a logic 0 on the lower input of this AND gate at this time.

As the scanning period progresses from the time T2A, the apparatus remains in the last-described condition until the one-shot 197 times out, turns off, and removes the logic 1 from the upper input of the AND gate 199. This occurs at a time T2B, as shown by the right-hand edge of the zone 246. This condition of the apparatus prevails until the time T4 at which the next greater chip outut signal peak causes a logic 1 to appear momentarily on the lower input of each of the AND gates 199 and 201 as shown by the curve 245.

The appearance of the logic 1 on the lower input of the AND gate 199 at the time T4 leaves the output of that gate at logic 0, since the upper input of that gate is presently at logic 0. However, the appearance of the logic 1 on the lower input of the AND gate 201, in combination with the logic 1 which is now present on the upper input of that gate, causes the latter to apply a logic 1 to the set terminal 208 of the flip-flop 209. This sets the flip-flop 209, which then removes the logic 1 from the upper input of the AND gate 207 and applies a logic 1 to the lower input of the AND gate 206. The output of the latter remains at logic 0, however, because of the logic 0 which is present on its upper input.

The apparatus remains in the last described condition throughout the remainder of the scanning period, with the switch 188 closed as shown by the zone 250. At the end of the scanning period at the time T7, and with the switch 188 still closed, the cam 212 allows the switch 213 to open. This removes the logic 1 from the upper input of the NOR gate 205. Since there is a logic 0 on the lower input of the NOR gate 205, the output of the latter now places a logic 1 on the upper input of the AND gate 206 and on the lower input of the AND gate 207.

The flip-flop 209 is still set at this time. Consequently, there is still a logic 0 on the upper input of the AND gate 207 which keeps the output of the latter at logic 0. Also there is still a logic 1 on the lower input of the AND gate 206. This logic 1 coacts with the logic 1 now on the upper input of the AND gate 206 to cause a logic 1 to appear on the output of this gate which turns on the transistor 232. The latter now energizes the motor 236 to move the lens 1 down toward its far limit position. This energization of the motor 236 and resulting downward movement of the lens 1 continue throughout the ensuring mirror return period until the start of the next scanning period, at which time the resetting of the flip-flop 209 disables the AND gate 206 and turns off the transistor 232.

The downward movement of the lens 1 as just described is appropriate for the situation illustration in portion A of FIG. 9, since it was assumed for this situation that the lens 1 was too far out for the existing object distance. It can now be seen that portion A shows this too far out position of the lens 1 by showing the zone 246 as starting to the left of the maximum or correlation peak of the time T4.

The operation which occurs during the first scanning and mirror return periods as just described is repeated in the subsequent scanning and mirror return periods. Consequently, the lens 1 is moved progressively downward toward its proper focus position and the closure time T2A of the switch 188 is correspondingly made to occur progressively later in each succeeding scanning period. These actions continue until a scanning period occurs wherein the lens 1 has been moved so far down that the switch closure time T2A occur just prior to the time T4 at which the correlation peak occurs. This condition is illustrated by the portion B of FIG. 9.

The operation of the apparatus from the time T1 up to the time T4 of the scanning period of portion B is the same as that described for the first scanning period of portion A. Thus, at the time T2A, the switch 188 closes and starts the one-shot 197 as shown by the zone 247. This causes a logic 1 to appear on the upper input of the AND gate 199. The closure of the switch 188 also puts a logic 1 on the upper input of the AND gate 201.

Accordingly, at the time T4 at which the output terminal 186 applies a logic 1 to the lower input of each of the AND gates 199 and 201, these gates apply a logic 1 to the set terminals of both of the flip-flops 203 and 209. The set flip-flop 209 then applies a logic 1 to the lower input of the AND gate 206 and removes the logic 1 from the upper input of the AND gate 207. As before, this does not affect the outputs of the AND gates 206 and 207 which are held at logic 0 by the NOR gate 205. The setting of the flip-flop 203 causes it to apply a logic 1 to the lower input of the NOR gate 205, but this does not change the logic 0 on the output of the latter. After the occurrence of the time T4 pulse, the outputs of the AND gates 199 and 201 return to logic 0, but the flip-flops 203 and 209 remain in their set condition. At the time T2B, the one-shot 197 turns off, but this does not change any other condition of the apparatus. The switch 188 remains closed as shown by the zone 251.

The apparatus remains in the last described condition until the end of the scanning period at the time T7, at which time the opening of the switch 213 removes the logic 1 from the upper input of the NOR gate 205. However, since the set flip-flop 203 is still supplying a logic 1 to the lower input of the NOR gate 205, the output of the latter remains at logic 0 at this time and throughout the ensuring mirror return period. Accordingly, the output of each of the AND gates 206 and 207 remains at logic 0 throughout this mirror return period, and no further movement of the lens 1 is effected. This condition prevails for subsequent scanning and mirror return periods until a new refocusing operation is called for by a change in the object distance and/or a change in the position of the lens 1.

Let it now be assumed that the situation illustrated in the portion C of FIG. 9 exists. As previously noted, the position of the lens 1 in the scanning period of this particular situation is such that the lens 1 is too far in - that is, is in its focus position for an object distance which is greater than the existing object distance. With the foregoing explanation in mind, it can be seen that this too far in position of the lens 1 is shown in portion C by the location of the zones 248 and 252 to the right of the correlation peak of the time T4.

The operation of the apparatus from the time T1 up to the time of the closure of the switch 188 is the same as that which was described in connection with the scanning periods of portion A and B. In portion C, it is assumed that the switch 188 closes at a time T4A as shown by the zone 248. Just prior to the time T4A, the outputs of the AND gates 199 and 201 are at logic 0 and the flip-flops 203 and 209 are in their reset condition. Neither of these flip-flops has been set in this scanning period because the T2 and T4 pulses have occurred before the closure of the switch 188, and hence have occurred at times at which they could not turn on either of the AND gates 199 and 201 to set the flip-flops.

At the time T4A, the closure of the switch 188 turns on the one-shot 197 which then puts a logic 1 on the upper input of the AND gate 199. The closure of the switch 188 also puts a logic 1 on the upper input of the AND gate 201. However, this action cannot turn on either of the AND gates 199 and 201 during this scanning period, since there are no pulses produced on the output terminal 186 after the time T4. At the time T4B, the one-shot 197 turns off, but this does not change any other condition of the apparatus.

Consequently, the apparatus remains in the last described condition, with no setting of the flip-flops 203 and 209, throughout the scanning period. At the time T7, therefore, the flip-flop 209 is applying a logic 1 to the upper input of the AND gate 207. The opening of the switch 213 at this time causes the NOR gate 205 to apply a logic 1 to the lower input of the AND gate 207. Consequently, the output of the AND gate 207 changes to a logic 1 at the time T7 and turns on the transistor 233 for the ensuring mirror return period. During this period, therefore, the motor 236 moves the lens 1 upward or out toward its near limit position. This movement is appropriate for the situation illustrated in portion C, since it was assumed for this situation that the lens 1 is too far in for the existing object distance.

The operation which occurs during the scanning and mirror return periods as just described is repeated in the subsequent ones of those periods. Consequently, the lens 1 is moved progressively upward toward its proper focus position, and the closure time T4A of the switch 188 is correspondingly made to occur progressively earlier in each succeeding scanning period. These actions continue until a scanning period occurs wherein the lens 1 has been moved so far up that the switch closure time T4A occurs just prior to the time T4 at which the correlation peak occurs. This condition is illustrated by the portion D of FIG. 9.

The operation of the apparatus during the scanning period of portion D is identical to that described above in connection with the portion B. Briefly, the occurrence of the time T4 pulse within the zone 249 and during the on time of the one-shot 197 causes the AND gates 199 and 201 to set the respective flip-flops 203 and 209. The set flip-flop 203 holds the outputs of the AND gates 206 and 207 at logic 0 throughout the ensuing mirror return periods, whereby no further movement of the lens 1 is effected. Again, this condition prevails for subsequent scanning and mirror return periods until a new refocusing operation is called for.

So a not to unduly complicate the foregoing description, the latter has been based on the operation which takes place for a specific single object distance. This description, however, applies as well to the way in which the apparatus operates for any object distance within its operating range. A change in the object distance from the illustrative value merely moves the correction peak and the last pulse of the curve 245 to a corresponding different time or position in the concurrent scanning period. The apparatus then moves the lens 1 as needed to bring the zone 1 time slot into register with the new time of the correlation pulse. Thus, the apparatus causes the position of the lens 1 to follow the object distance, as is desired.

The above-described operation of the FIG. 8 apparatus may be summarized as follows:

1. The correlation position of the mirror 16, and the existing object distance, are represented in each scanning period by the position of the switch 188 at the time at which the last pulse of the curve 245 occurs for that scanning period;

2. The switch 188 establishes a time period at a time which represents the existing position of the lens 1, and the one-shot 197 establishes a relatively narrow time slot at the beginning of each of these periods;

3. When the lens 1 is properly positioned for the existing object distance, the last pulse and time slot coincide, causing both of the flip-flops 203 and 209 to be set. In the ensuing mirror return period, both of the AND gates 206 and 207 are disabled by the set flip-flop 203, and the motor 236 is not energized to move the lens 1;

4. If the lens 1 is too far out for the existing object distance, the closure of the switch 188 and the time slot occur before the last pulse occurs. As a result, the flip-flop 209 is set but the flip-flop 203 is not set. In the ensuing mirror return periods, the AND gate 206 is enabled and causes the motor 236 to move the lens 1 in. This action is repeated until the time slot has been moved to a position later in the scanning period so that it coincides with the last pulse;

5. If the lens 1 is too far in for the existing object distance, the closure of the switch 188 and the time slot occur after the occurrence of the last pulse. Consequently, no pulse occurs during the period in which the switch 188 is closed, and neither of the flip-flops is set during the scanning period. During the ensuing mirror return periods, therefore, the AND gate 207 is enabled and energizes the motor 236 to move the lens 1 out, and to move the time slot closer to the beginning of the scanning period. This action continues until the switch closure occurs sufficiently early in the scanning period to make the time slot coincide with the last pulse.

6. In performing the above-described operation, the apparatus effectively ascertains whether there is a pulse in the first zone or time slot. If there is, no repositioning of the lens 1 is necessary, and none is effected. If there is not, the apparatus ascertains whether there is a pulse in the second zone of the switch 188 closure period. If there is, the correlation pulse must have occurred after the switch closure, and the lens 1 must be moved in. If no pulse occurs during either of the first and second zones, then the switch closure must have occurred after the correlation pulse and the lens 1 must be moved out.

If a situation should occur wherein a changing object distance causes a pulse due to a minor peak, such as the pulse at the time T2, to fall in the first zone, the operation of the motor 236 in moving the lens 1 to its proper focus position could be interrupted. It has been found in practice, however, that the time of occurrence of such a pulse is sufficiently unstable so that the focusing movement of the lens 1 would be held up only momentarily.

The foregoing description of the operation of the FIG. 8 apparatus illustrates the manner in which this apparatus continuously determines the existing object distance, with the desired insensitivity to minor chip output signal peaks, even though that distance may be changing, and continuously repositions the lens 1 as necessary to keep the image of the object in focus on the plane 2.

In all of the apparatus forms which have been illustrated and described herein, it is desirable to make the scanning movement of the mirror 16 sufficiently rapid that motion artifacts arising from object and/or camera movement are minimized. It has been determined in practice that the desired degree of freedom from the effects of object and/or camera motion can be achieved by making the duration of the scanning period of the order of 50 milliseconds.

The several apparatus arrangements which have been disclosed and described herein have included circuitry which is external to the chip 8. It is to be understood, however, that such circuitry could, if desired, be included as a part of the chip 8.

It should be undertood also that the several disclosed members which are shown herein as being moved by spring force could be provided with such motion smoothing and/or damping means as are found to be necessary or desirable. It is noted also that the springs which are shown as providing such motion could, if desired, be replaced by other motion-producing means, such as the motors 21 and 236.

It is believed to be clear from the foregong description that the described apparatus according to the present invention fulfills the objects stated herein. Thus it has been shown that the apparatus does not leave the lens 1 in any position which is dictated merely by minor peaks in the chip output signal, but instead finally places the lens 1 only in those positions at which the lens 1 produces a properly focused image.

The embodiments of the invention in which an exclusive property or privilege is claimed are defined as follows:

1. Apparatus for providing a measure of the distance between the apparatus and an object, comprising a plurality of radiation responsive elements in two image correlation arrays, optical means for imaging said object on said image correlation arrays, scanning means for relatively moving at least a portion of said optical means and said image correlation arrays through a range of relative positions during a scanning period, signal processing means connected to said image correlation arrays to produce a correlation signal which peaks in a given direction at a one of said positions which is unique for the existing object distance, and which tends to peak in said direction to a lesser extent at others of said positions, selective means connected to receive said correlation signal for producing a predetermined control effect upon the occurrence of each of said peaks in said period which is greater than all previous ones of said peaks occurring during said period, and responsive means responsive to said control effect to effectively identify the one of said positions at which said control effect is finally produced in said period as a measure of the existing object distance, said responsive means including first means coupled to said scanning means for providing a ramp signal of a value which changes in synchronism with said relative movement such that, at any time in said period, the value of said ramp signal represents the concurrent one of said relative positions, and second means connected to said first means to receive said ramp signal, and connected to said selective means to receive said control effect, for providing an output signal of a value which represents the value had by said ramp signal at the time of the latest production of said control effect in said period, the value of said output signal at the end of said period thus being a measure of the existing object distance.

2. In apparatus for moving a lens to the position at which it produces, on a given plane, a focused image of an object, wherein said position corresponds to the position of a mirror, moved throughout a scanning period, at which said mirror causes a light responsive element signal to reach a peak which is greater than all others of such peaks occurring in said period, the improvement comprising selective means connected to receive said signal for producing a polarity shift in a given direction in a second signal upon the occurrence in said period of each peak in said element signal which is greater than all previous peaks in said element signal in the same direction which have occurred in said period, and responsive means responsive to said polarity shift to place said lens in a position corresponding to that of said mirror at the time of the final occurrence of said polarity shift in said period.

3. Automatic focusing apparatus for automatically bringing an image of an object into focus on a predetermined plane for the existing object distance, comprising a plurality of radiation responsive elements in two image correlation arrays, a movable optical means for imaging said object on said image correlation arrays, scanning means for moving said optical means through a range of positions during a scanning period, signal processing means connected to said image correlation arrays to produce a first signal which peaks in a given direction at a one of said positions of said optical means which is unique for the existing object distance, and which tends to peak in said direction to a lesser extent at others of said positions of said optical means, selective means connected to receive said first signal for producing a second signal which exhibits a predetermined change upon the occurrence of each of said peaks in said period which is greater than all previous ones of said peaks occurring during such period, a positionable optical device for producing an image of said object on said plane, the last mentioned image being substantially in focus on said plane for the existing object distance when the position of said optical device corresponds to said one of said positions of said optical means which is unique to that object distance, and responsive means responsive to said second signal for placing said optical device in a position corresponding to the one of said positions of said optical means at which said second signal exhibits said predetermined change for the last time in said period, said responsive means including first means coupled to said scanning means for providing a ramp signal of a value representing the instantaneous position of said optical means throughout said period, second means connected to said first means to receive said ramp signal, and connected to said selective means to receive said second signal and to respond to each occurrence of said predetermined change, for providing an optical means position signal of a value which represents the value had by said ramp signal at the time of the latest occurrence of said predetermined change in said period, and control means responsive to said optical means position signal for placing said optical device in a final position corresponding to the final value of the last-mentioned signal at the end of said period, said control means including means coupled to said optical device for providing an optical device position signal of a value which represents the instantaneous position of said optical device, a signal comparator connected to receive said optical means position signal and said optical device position signal and to provide an output signal which represents the difference between the two received signals, and moving means coupled to said optical device and responsive to said output signal to move said optical device in the direction to minimize said output signal.

4. Automatic focusing apparatus for automatically bringing an image of an object into focus on a predetermined plane for the existing object distance, comprising a plurality of radiation responsive elements in two image correlation arrays, a movable optical means for imaging said object on said image correlation arrays, scanning means for moving said optical means through a range of positions during a scanning period, signal processing means connected to said image correlation arrays to produce a first signal which peaks in a given direction at a one of said positions of said optical means which is unique for the existing object distance, and which tends to peak in said direction to a lesser extent at others of said positions of said optical means, selective means connected to receive said first signal for producing a second signal which exhibits a predetermined change upon the occurrence of each of said peaks in said period which is greater than all previous ones of said peaks occurring during such period, a positionable optical device for producing an image of said object on said plane, the last mentioned image being substantially in focus on said plane for the existing object distance when the position of said optical device corresponds to said one of said positions of said optical means which is unique to that object distance, and responsive means responsive to said second signal for placing said optical device in a position corresponding to the one of said positions of said optical means at which said second signal exhibits said predetermined change for the last time in said period, said responsive means including first means coupled to said scanning means for providing a ramp signal of a value representing the instantaneous position of said optical means throughout said period, second means connected to said first means to receive said ramp signal, and connected to said selective means to receive said second signal and to respond to each occurrence of said predetermined change, for providing an optical means position signal of a value which represents the value had by said ramp signal at the time of the latest occurrence of said predetermined change in said period, and control means responsive to said optical means position signal for placing said optical device in a final position corresponding to the final value of the last-mentioned signal at the end of said period, said control means including a spring coupled to said optical device for urging the latter to move in one direction, and an electromechanical device connected to said second means to receive said optical means position signal and coupled to said optical device to urge the latter in the direction opposite to the first-mentioned direction with a force which is dependent upon the value of said optical means position signal.

5. Automatic focusing apparatus for automatically bringing an image of an object into focus on a predetermined plane for the existing object distance, comprising a plurality of radiation responsive elements in two image correlation arrays, a movable optical means for imaging said object on said image correlation arrays, scanning means for moving said optical means through a range of positions during a scanning period and for cyclically repeating the scanning period, signal processing means connected to said image correlation arrays to produce a first signal which peaks in a given direction at a one of said positions of said optical means which is unique for the existing object distrance, and which tends to peak in said direction to a lesser extent at others of said positions of said optical means, selective means connected to receive said first signal for producing a second signal which exhibits a predetermined change upon the occurrence of each of said peaks in said period which is greater than all previous ones of said peaks occurring during such period, a positionable optical device for producing an image of said object on said plane, the last-mentioned image being substantially in focus on said plane for the existing object distance when the position of said optical device corresponds to said one of said positions of said optical means which is unique to that object distance, and responsive means responsive to said second signal for placing said optical device in a position corresponding to the one of said positions of said optical means at which said second signal exhibits said predetermined change for the last time in said period, said responsive means including switch means coupled to said scanning means and to said optical device for establishing a time zone in each of said scanning periods at a time dependent upon the concurrent position of said optical device, logic means connected to said switch means and to said selective means to receive said second signal and to compare the times of occurrence in each of said scanning periods of said time zone and of the final one of said predetermined changes in said second signal for that scanning period, and to produce a motor drive signal when said final change in said second signal does not occur within said time zone, and motor means connected to receive said motor drive signal and coupled to said optical device to move the latter in the direction to minimize said motor drive signal and hence to position said optical device and said time zone in positions of correspondence with the occurrence of said final change in second signal for each of said scanning periods.

* * * * *